United States Patent
Horiuchi

(10) Patent No.: US 8,643,959 B2
(45) Date of Patent: Feb. 4, 2014

(54) ZOOM LENS AND IMAGE PICKUP APPARATUS EQUIPPED WITH ZOOM LENS

(75) Inventor: Akihisa Horiuchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 13/488,154

(22) Filed: Jun. 4, 2012

(65) Prior Publication Data

US 2012/0307377 A1 Dec. 6, 2012

(30) Foreign Application Priority Data

Jun. 6, 2011 (JP) ................................. 2011-126123

(51) Int. Cl.
G02B 9/34 (2006.01)
(52) U.S. Cl.
USPC .......................................................... 359/774
(58) Field of Classification Search
USPC ......................................... 359/687, 754, 774
See application file for complete search history.

(56) References Cited

U.S. PATENT DOCUMENTS

| 7,430,079 B2 | 9/2008 | Watanabe |
| 7,760,441 B2 | 7/2010 | Ono et al. |
| 7,830,613 B2 * | 11/2010 | Ichikawa ...................... 359/687 |

* cited by examiner

Primary Examiner — Joseph P Martinez
(74) Attorney, Agent, or Firm — Canon USA, Inc. IP Division

(57) ABSTRACT

A zoom lens includes a first lens unit having positive refractive power, a second lens unit having negative refractive power, a third lens unit having positive refractive power, and a fourth lens unit having positive refractive power. The first to fourth lens units move during zooming. The first lens unit includes a cemented lens obtained by cementing negative and positive lenses, the second lens unit includes negative, negative, and positive lenses, the third lens unit includes positive and negative lenses, and the fourth lens unit includes a positive lens. Movement amounts M1 and M3 of the first and third lens units, respectively, during zooming from the wide-angle end to the telephoto end and focal lengths f1 and f3 of the first and third lens units, respectively, are appropriately set based on predetermined mathematical conditions.

6 Claims, 25 Drawing Sheets

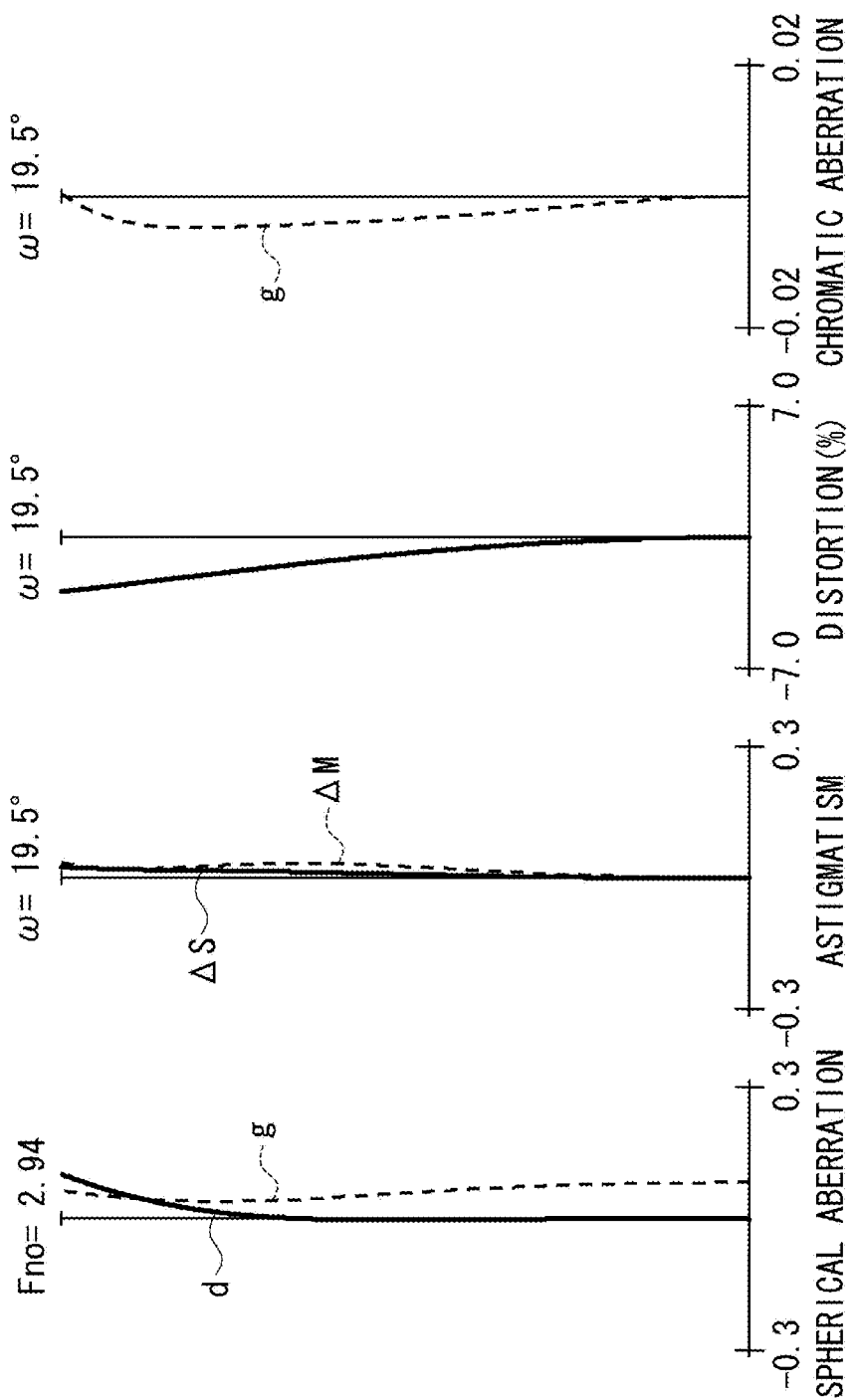

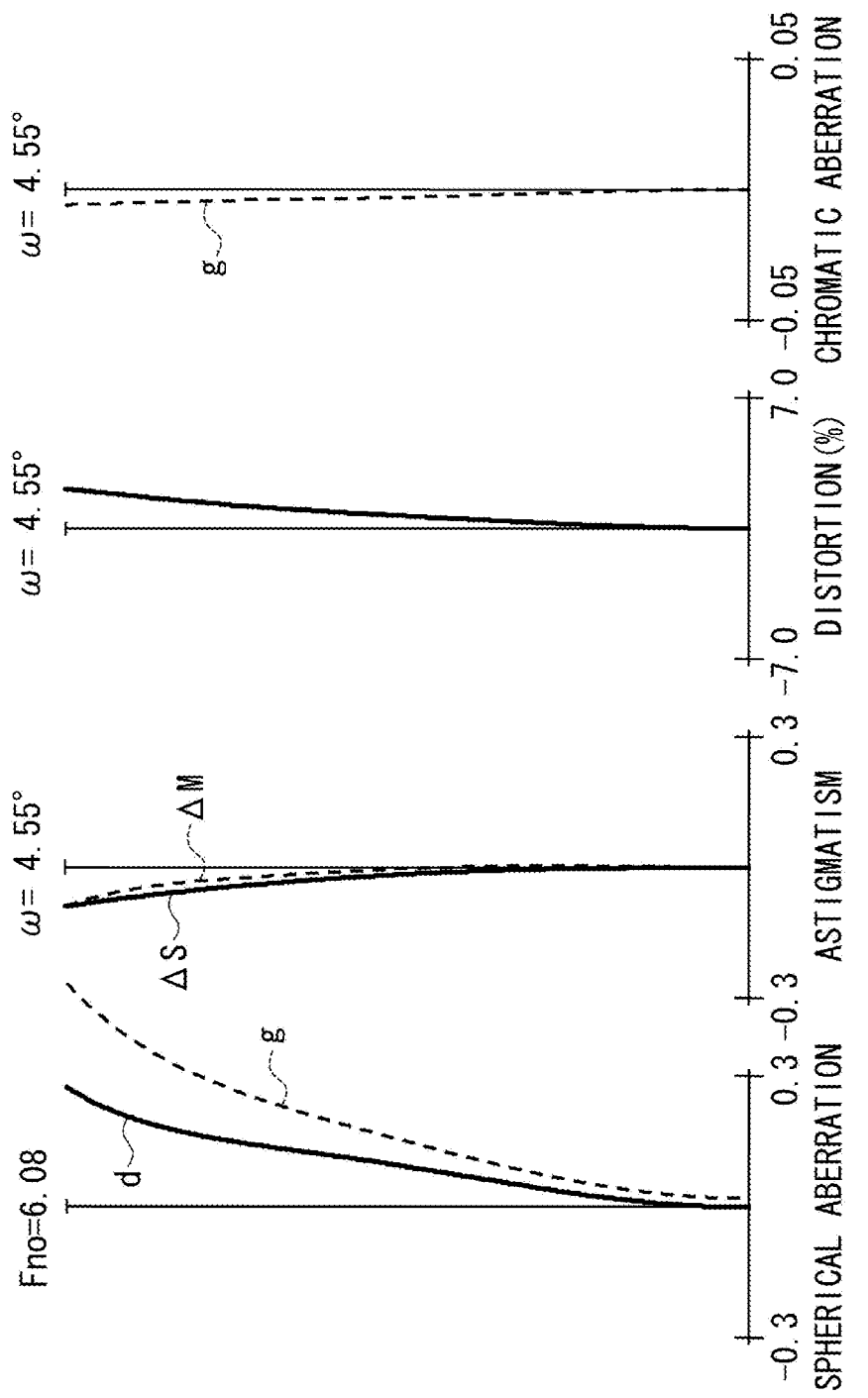

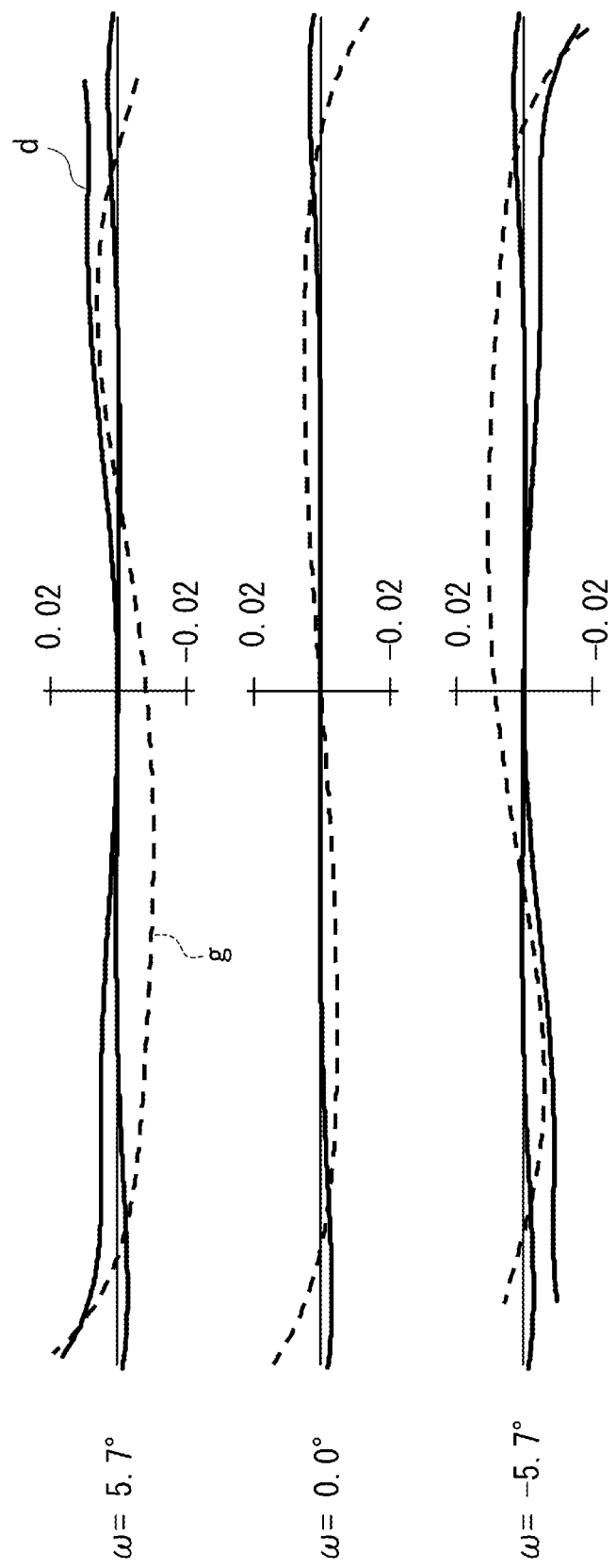

ZOOM LENS AND IMAGE PICKUP APPARATUS EQUIPPED WITH ZOOM LENS

BACKGROUND OF THE INVENTION

1. Field of the Invention

The invention relates to a zoom lens, and more particularly, to a zoom lens suitable for a photographic lens used in an image pickup apparatus such as a digital still camera, a video camera, a monitoring camera, a broadcasting camera, or a silver-halide film camera.

2. Description of the Related Art

In recent years, image pickup apparatuses such as digital still cameras, video cameras, monitoring cameras using a solid-state image sensor, or silver-halide film cameras have been miniaturized while retaining high functionality. In a photographic optical system used in an image pickup apparatus of the type listed above, there is a demand for a zoom lens that is compact, has a short lens length, and high resolution throughout the zooming range. In addition, in order to obtain a wide image-sensing range even in a short shooting distance, the zoom lens is required to have a wide viewing angle and a short focal length at the wide-angle end.

There is known in the current state of the art, a four-unit zoom lens including a first lens unit of a positive refractive power, a second lens unit of a negative refractive power, a third lens unit of a positive refractive power, and a fourth lens unit of a positive refractive power in order from an object side to an image side. U.S. Pat. No. 7,760,441 and U.S. Pat. No. 7,830,613 discuss a rear-focus type four-unit zoom lens in which zooming is performed by moving each lens unit, and focusing is performed while an image plane variation caused by the zooming is corrected by moving the fourth lens unit.

In order to obtain high optical performance across the entire zoom range along with a wide viewing angle and a high zoom ratio in the zoom lens used in the image pickup apparatus, it is important to appropriately set a zoom type, refractive powers of each lens unit, lens configurations of each lens unit, and other like parameters. For the four-unit zoom lens described above, it is important to appropriately set a lens configuration of each lens unit, movement amounts of the first and third lens units caused by the zooming, refractive powers (inverse of the focal length) of the first and third lens units, and the like.

In addition, it is important to appropriately set a movement amount of the second lens unit caused by the zooming, refractive powers of the second and fourth lens units, and the like. If such configurations are not appropriately set, in a miniaturized zoom lens, it is difficult to obtain high optical performance across the entire zoom range and to maintain a wide viewing angle and a high zoom ratio.

U.S. Pat. No. 7,760,441 and U.S. Pat. No. 7,830,613 respectively discuss retractable zoom lenses having a reduced number of constituent lenses and capable of maintaining a high zoom ratio. In this type of zoom lens, when it is retracted, the overall size thereof can be substantially reduced. However, since a movement amount of the first lens unit is greater than a movement amount of the third lens unit during zooming, a total optical length tends to remain excessively large.

In addition, since the movement amount of the first lens unit during zooming is large, it is necessary to provide a multi-stage lens barrel in order to obtain a thin shape when it is retracted. Therefore, the configuration of the lens barrel becomes complicated, and a size thereof tends to increase in a radial direction. If the refractive powers of each lens surface increase to obtain a thin shape, axial chromatic aberration, chromatic aberration of magnification, and coma increase at the wide-angle end so that correction of such various types of aberration tends to be difficult.

U.S. Pat. No. 7,430,079 discusses a zoom lens having a high zoom ratio of approximately ×10 while it can be miniaturized at the time of retraction. However, the refractive power of the first lens unit increases in order to implement a high zoom ratio, and axial chromatic aberration or chromatic aberration of magnification increase at the wide-angle end so that correction of such various types of aberration tends to be difficult.

SUMMARY OF THE INVENTION

Aspects of the present invention are directed to embodiments of a zoom lens having high optical performance across the entire zoom range with a wide viewing angle and a high zoom ratio while the entire zoom lens is miniaturized, and an image pickup apparatus equipped with the zoom lens.

According to an aspect of the present invention, a zoom lens includes, in order from an object side to an image side and arranged along an optical axis thereof: a first lens unit having positive refractive power, a second lens unit having negative refractive power, a third lens unit having positive refractive power, and a fourth lens unit having positive refractive power. The first lens unit includes a cemented lens obtained by cementing a negative lens and a positive lens in order from the object side to the image side; the second lens unit includes negative, negative, and positive lenses in order from the object side to the image side; the third lens unit includes positive and negative lenses in order from the object side to the image side; and the fourth lens unit includes a positive lens. During zooming from a wide-angle end to the telephoto end, the first to fourth lens units move such that a distance between the first and second lens units increases, a distance between the second and third lens units decreases, and a distance between the third and fourth lens units increases, wherein the following conditions are satisfied:

$$1.0 < M3/M1 < 3.0, \text{ and}$$

$$2.5 < f1/f3 < 8.0,$$

where M1 and M3 denote movement amounts of the first and third lens units, respectively, during zooming from the wide-angle end to the telephoto end, and f1 and f3 denote focal lengths of the first and third lens units, respectively.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A, 6B, and 6C are aberration charts of the zoom lens at the wide-angle end, the middle zoom position, and the telephoto end, respectively, according to the third embodiment.

FIGS. 8A, 8B, and 8C are aberration charts of the zoom lens at the wide-angle end, the middle zoom position, and the telephoto end, respectively, according to the fourth embodiment.

FIGS. 11A and 11B are lateral aberration charts of the zoom lens in a standard state at the wide-angle end and the telephoto end, respectively, according to the first embodiment.

DESCRIPTION OF THE EMBODIMENTS

Various exemplary embodiments, features, and aspects of the invention will be described in detail below with reference to the drawings.

A zoom lens according to an exemplary embodiment of the invention includes a first lens unit of a positive refractive power, a second lens unit having negative refractive power, a third lens unit having positive refractive power, and a fourth lens unit having positive refractive power in order from an object side to an image side.

During zooming from the wide-angle end to the telephoto end, the first to fourth lens units move such that a distance between the first and second lens units increases, a distance between the second and third lens units decreases, and a distance between the third and fourth lens units increases.

The first lens unit includes a cemented lens obtained by cementing negative and positive lenses in order from the object side to the image side. The second lens unit includes negative, negative, and positive lenses in order from the object side to the image side. The third lens unit includes positive and negative lenses in order from the object side to the image side. The fourth lens unit includes a positive lens.

According to an exemplary embodiment of the invention, a ratio of the movement amount between the first and third lens units during zooming from the wide-angle end to the telephoto end, a ratio of the focal length between the first and third lens units are appropriately set. As a result, it is possible to obtain a zoom lens capable of appropriately correcting various types of aberration with a wide viewing angle and a miniaturized size in entirety.

Figure 1:
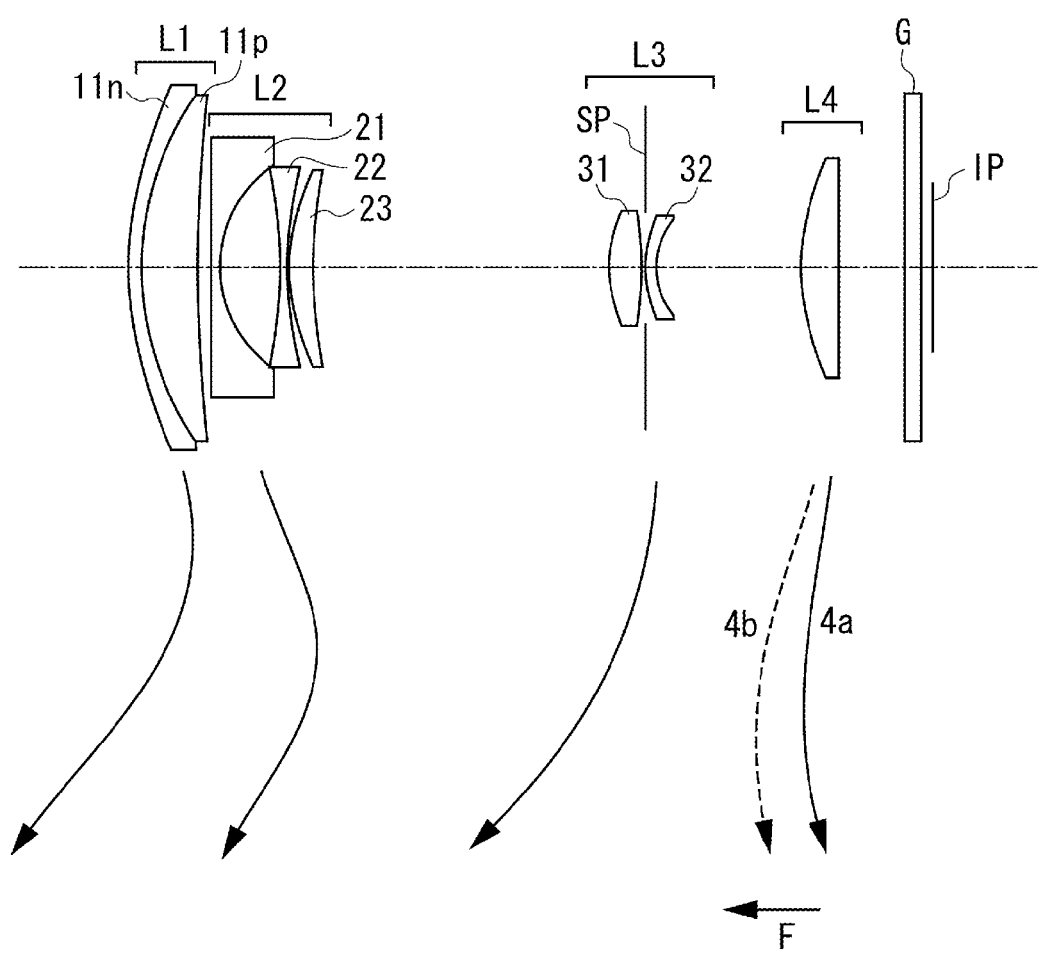
FIG. 1 is a lens cross-sectional view illustrating a zoom lens at the wide-angle end, according to a first embodiment of the invention.
Figure 2A:
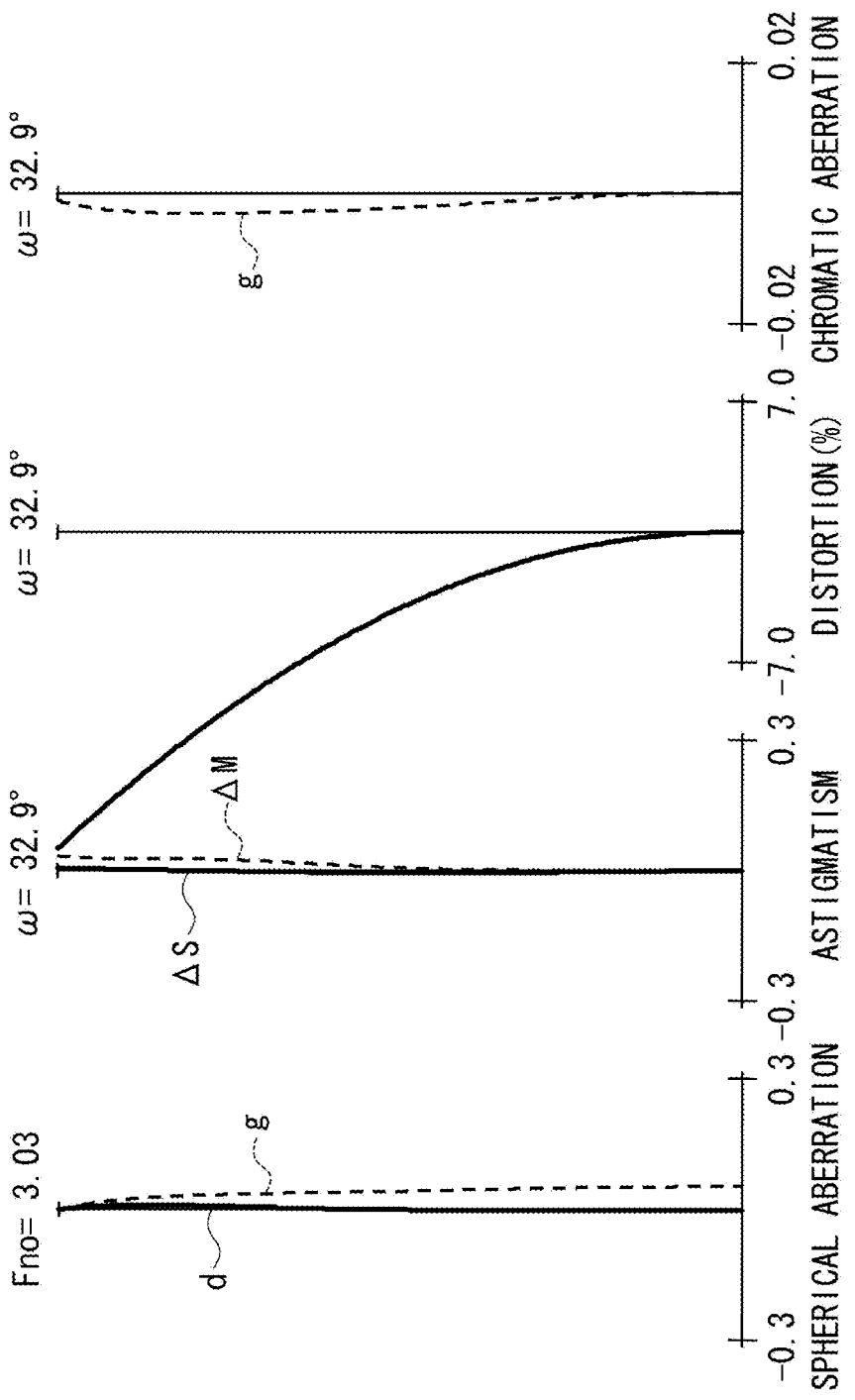
FIGS. 2A, 2B, and 2C are aberration charts of the zoom lens at the wide-angle end, the middle zoom position, and the telephoto end, respectively, according to the first embodiment.
Figure 2B:
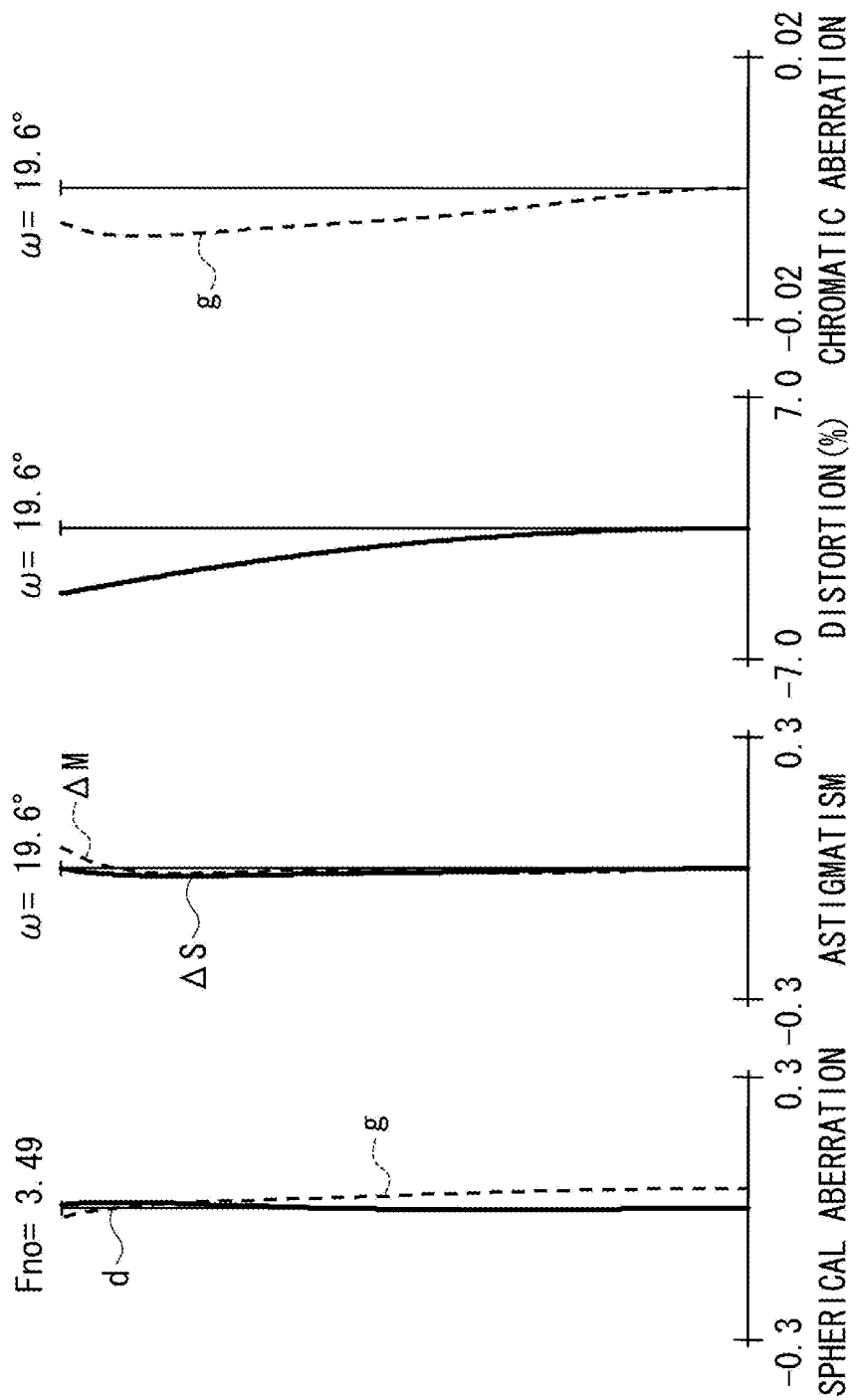
Figure 2C:
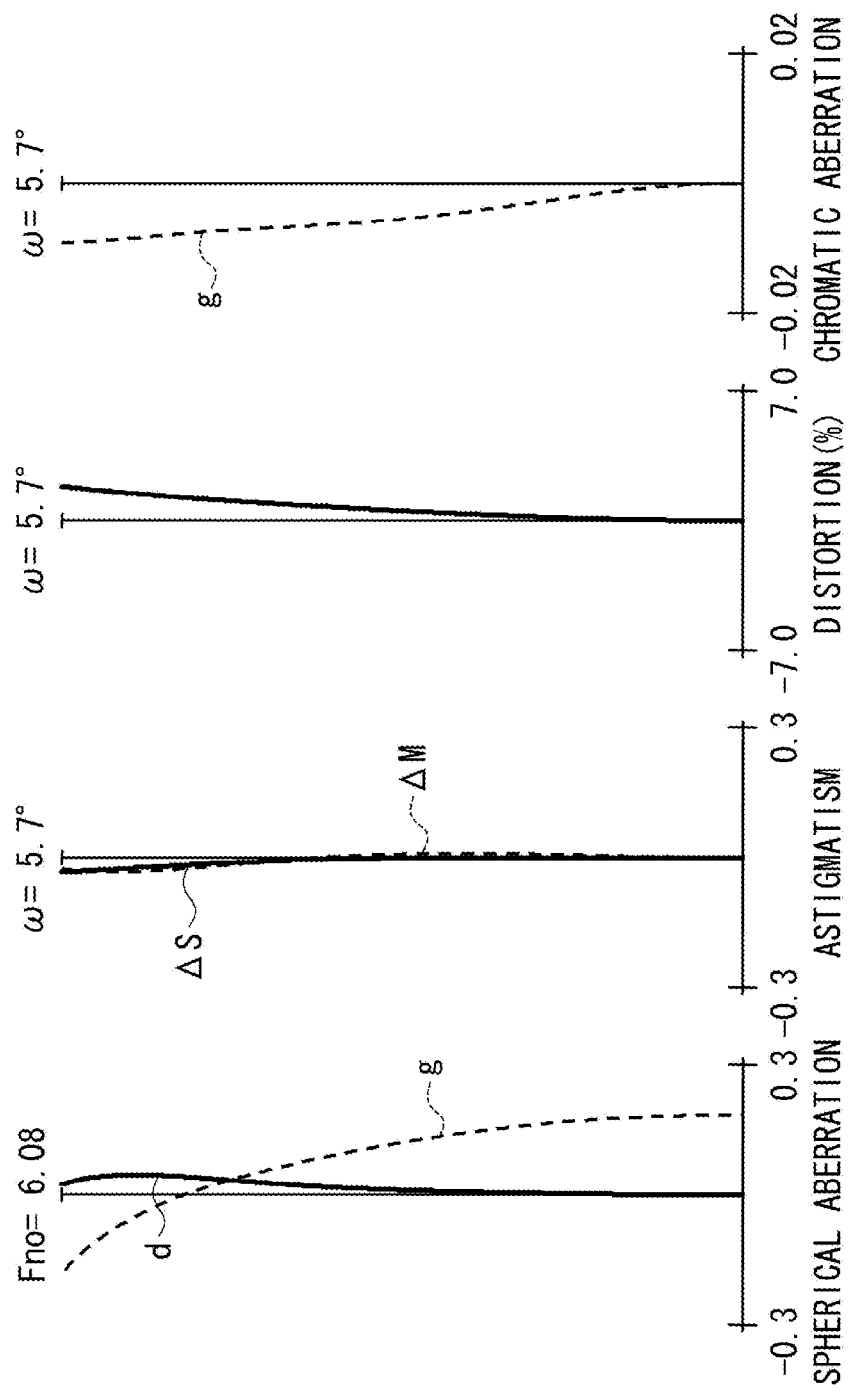

FIG. 1 is a lens cross-sectional view illustrating a zoom lens according to a first embodiment of the invention at the wide-angle end (short focal length end). FIGS. 2A, 2B, and 2C are aberration charts of the zoom lens at the wide-angle end, the middle zoom position, and the telephoto end (long focal length end), respectively, according to the first embodiment.

Figure 3:
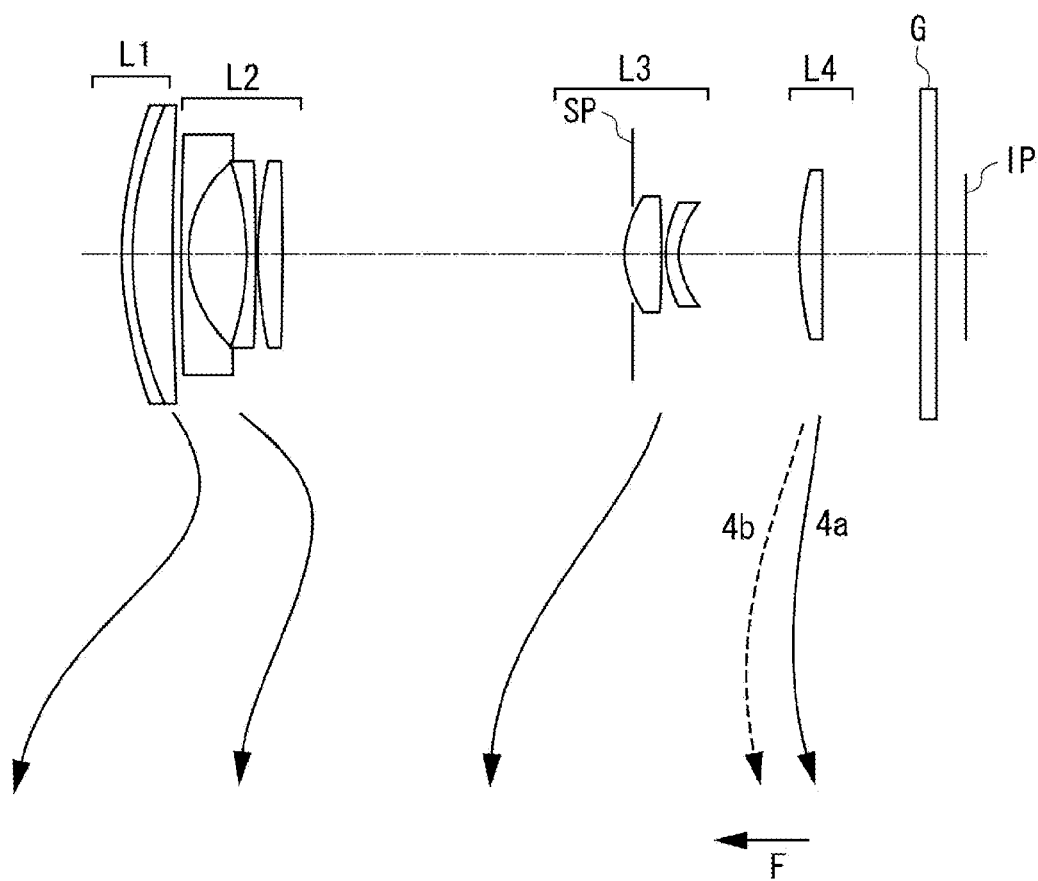
FIG. 3 is a lens cross-sectional view illustrating a zoom lens at the wide-angle end, according to a second embodiment.
Figure 4A:
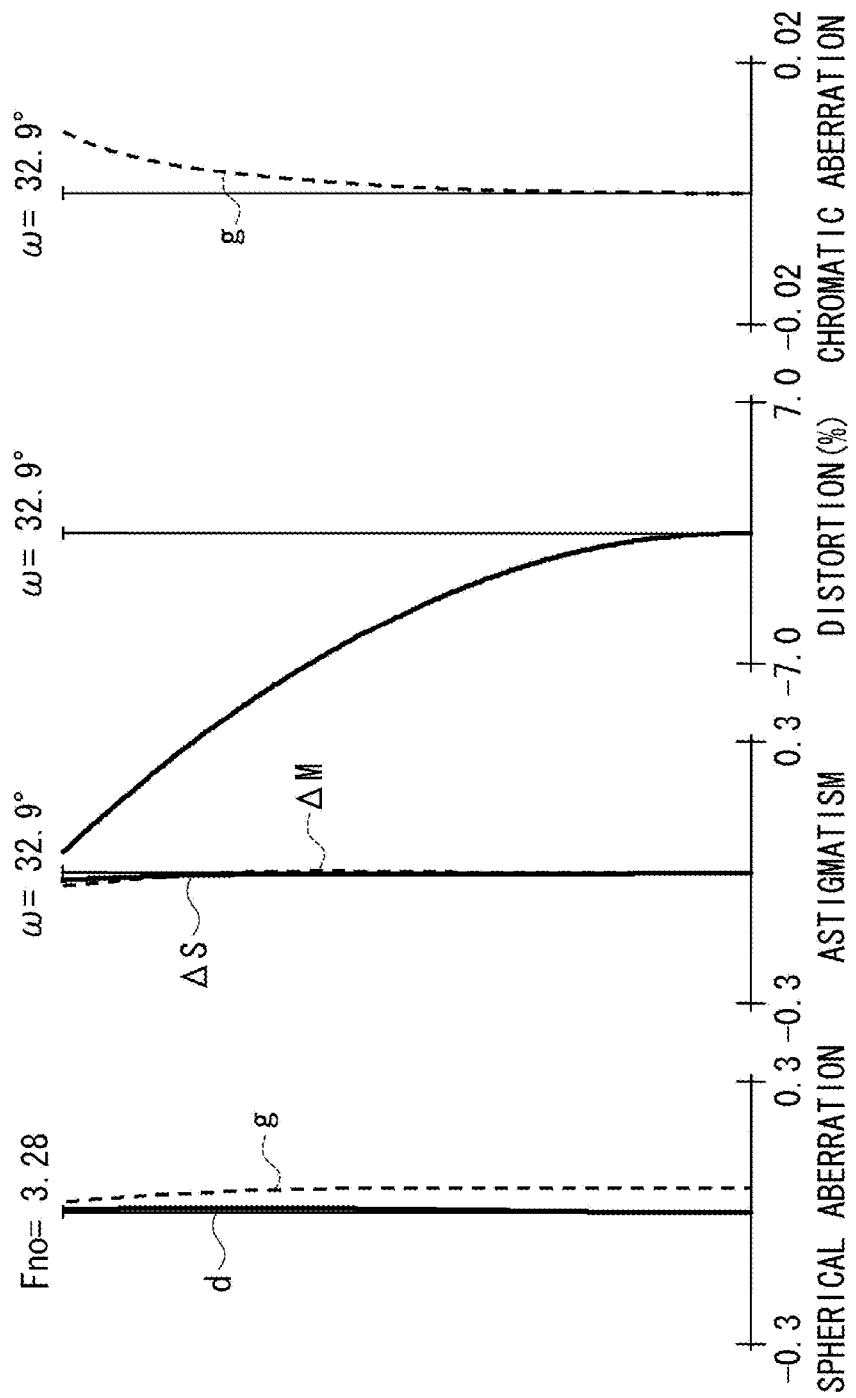
FIGS. 4A, 4B, and 4C are aberration charts of the zoom lens at the wide-angle end, the middle zoom position, and the telephoto end, respectively, according to the second embodiment.
Figure 4B:
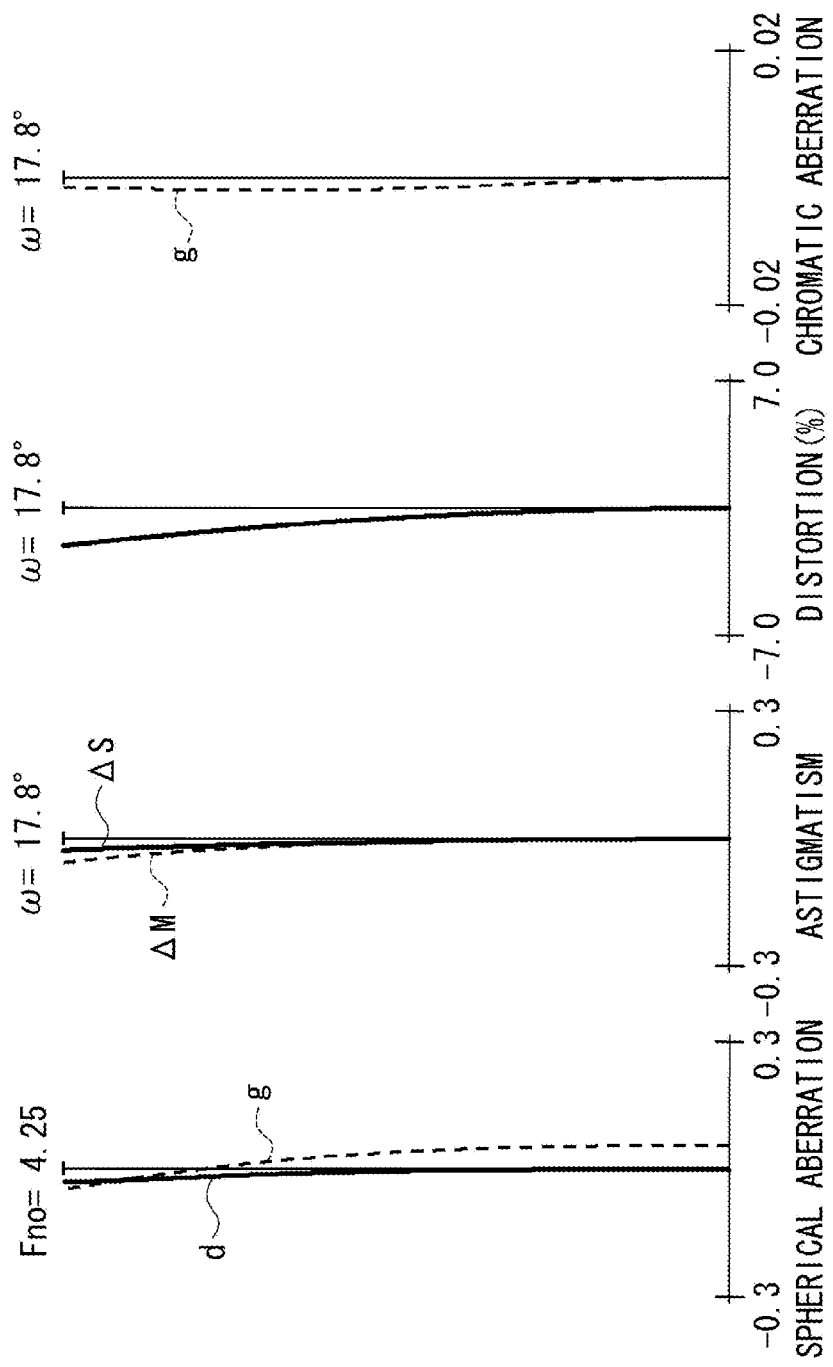
Figure 4C:
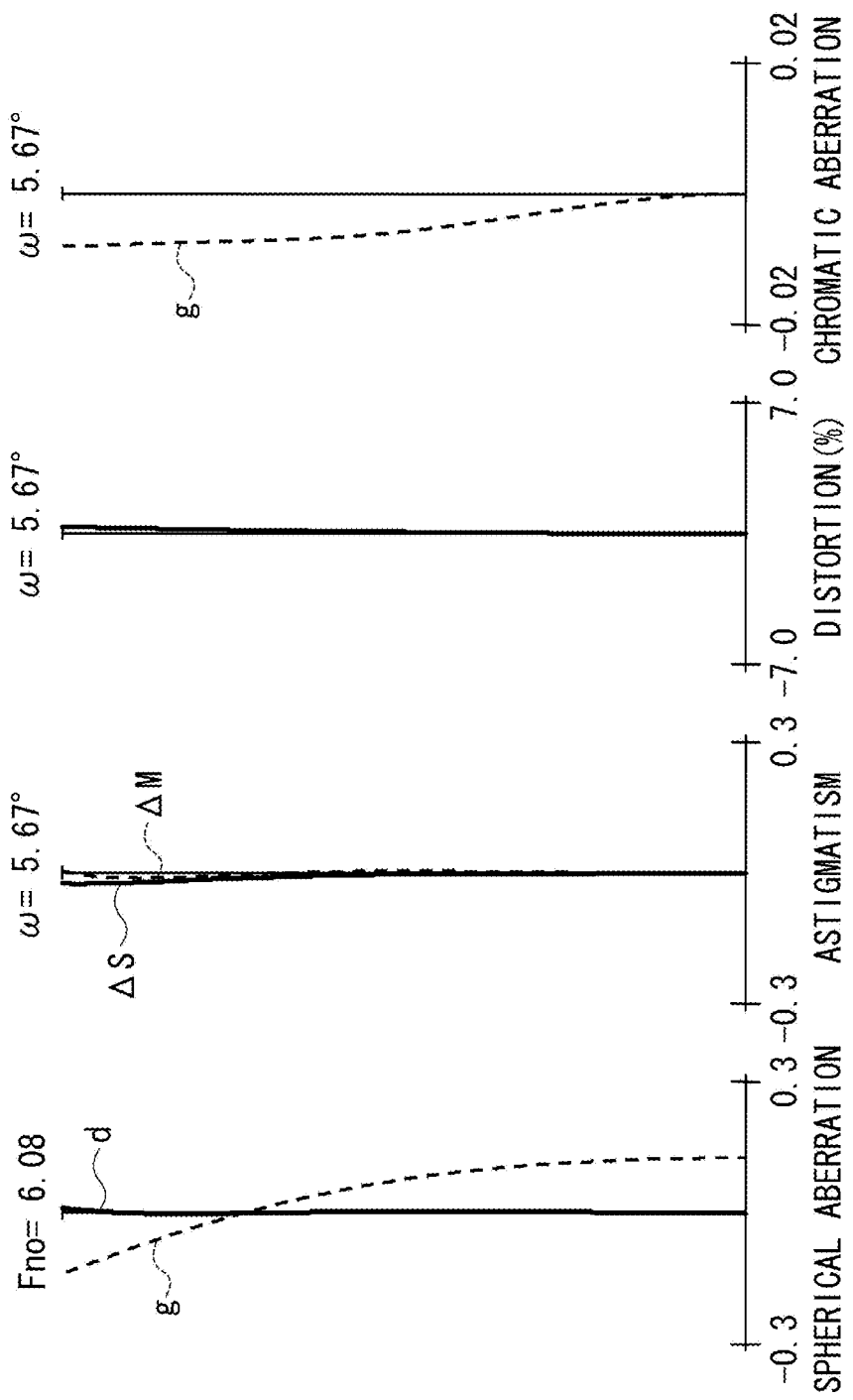
Figure 5:
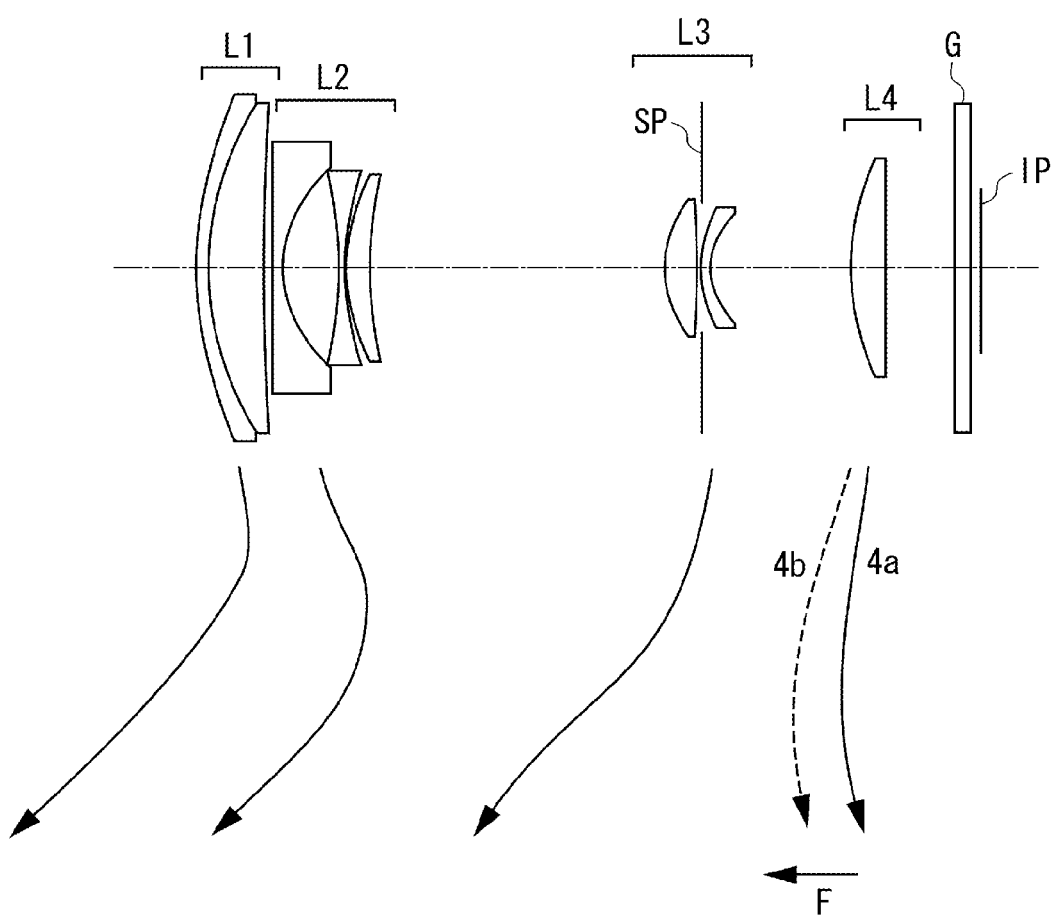
FIG. 5 is a lens cross-sectional view illustrating a zoom lens at the wide-angle end, according to a third embodiment.
Figure 6A:
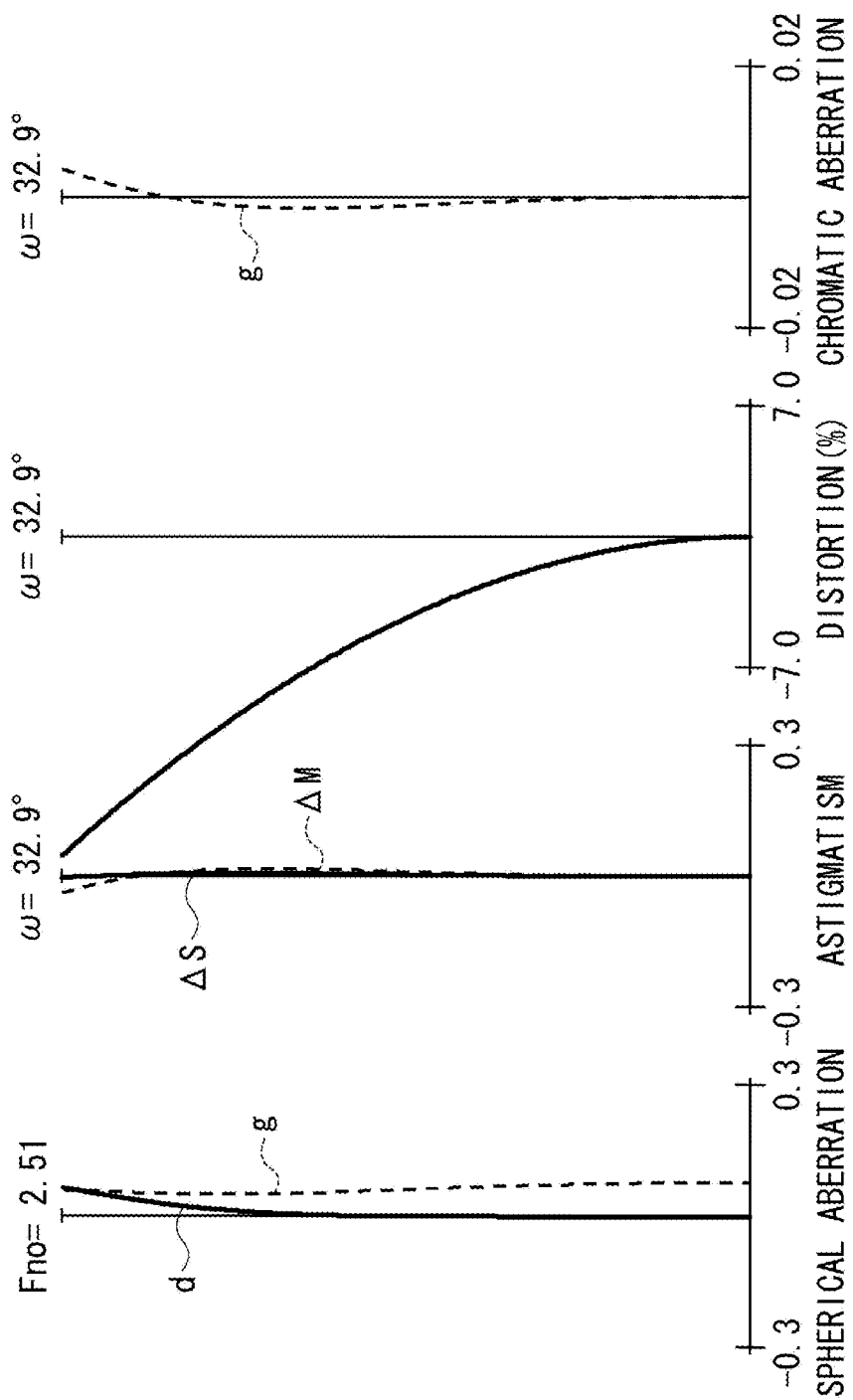
Figure 6C:
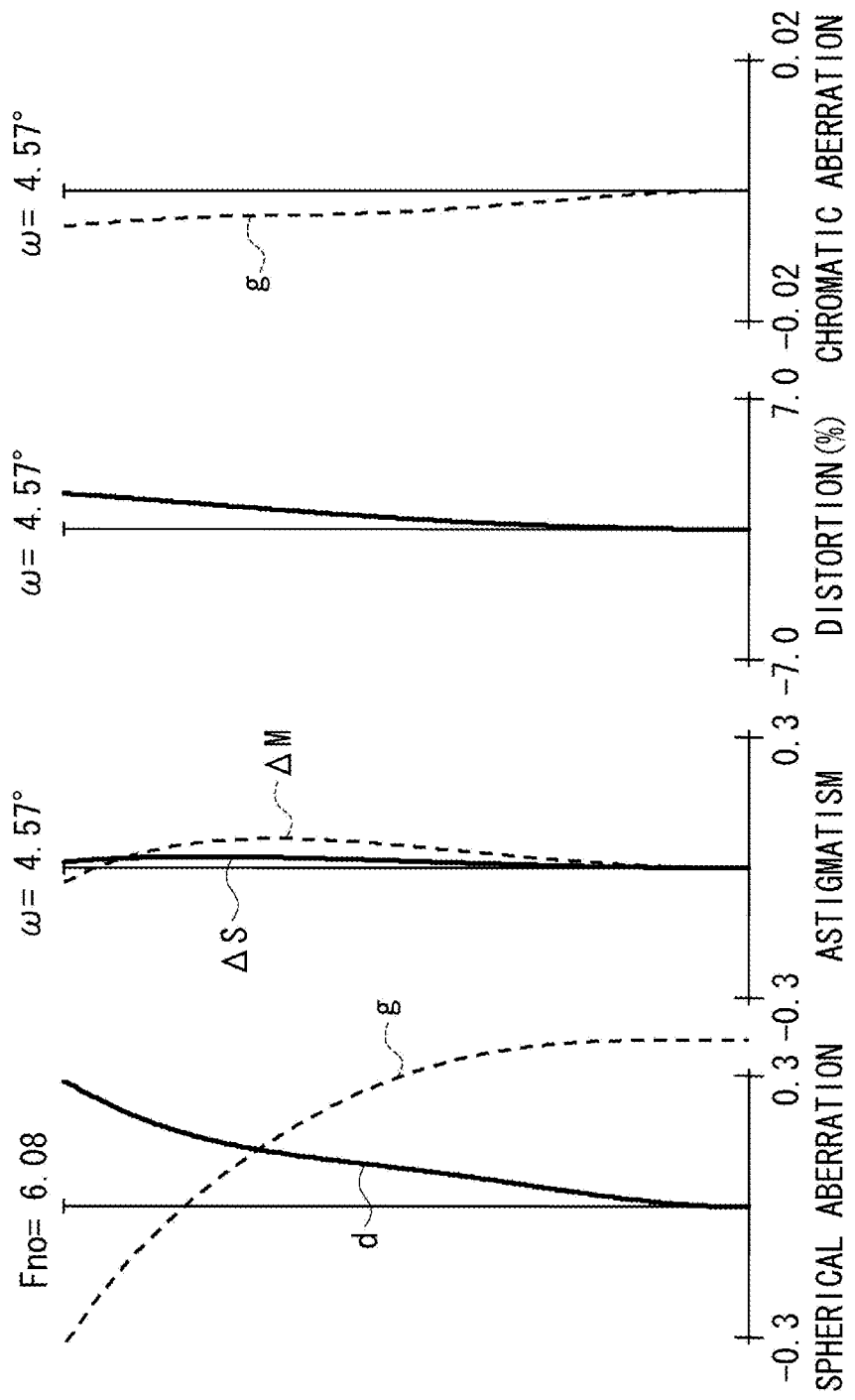

FIG. 3 is a lens cross-sectional view illustrating a zoom lens at the wide-angle end, according to a second embodiment of the invention. FIGS. 4A, 4B, and 4C are aberration charts of the zoom lens at the wide-angle end, the middle zoom position, and the telephoto end, respectively, according to the second embodiment. FIG. 5 is a lens cross-sectional view illustrating a zoom lens at the wide-angle end, according to a third embodiment of the invention. FIGS. 6A, 6B, and 6C are aberration charts of the zoom lens at the wide-angle end, the middle zoom position, and the telephoto end, respectively, according to the third embodiment.

Figure 7:
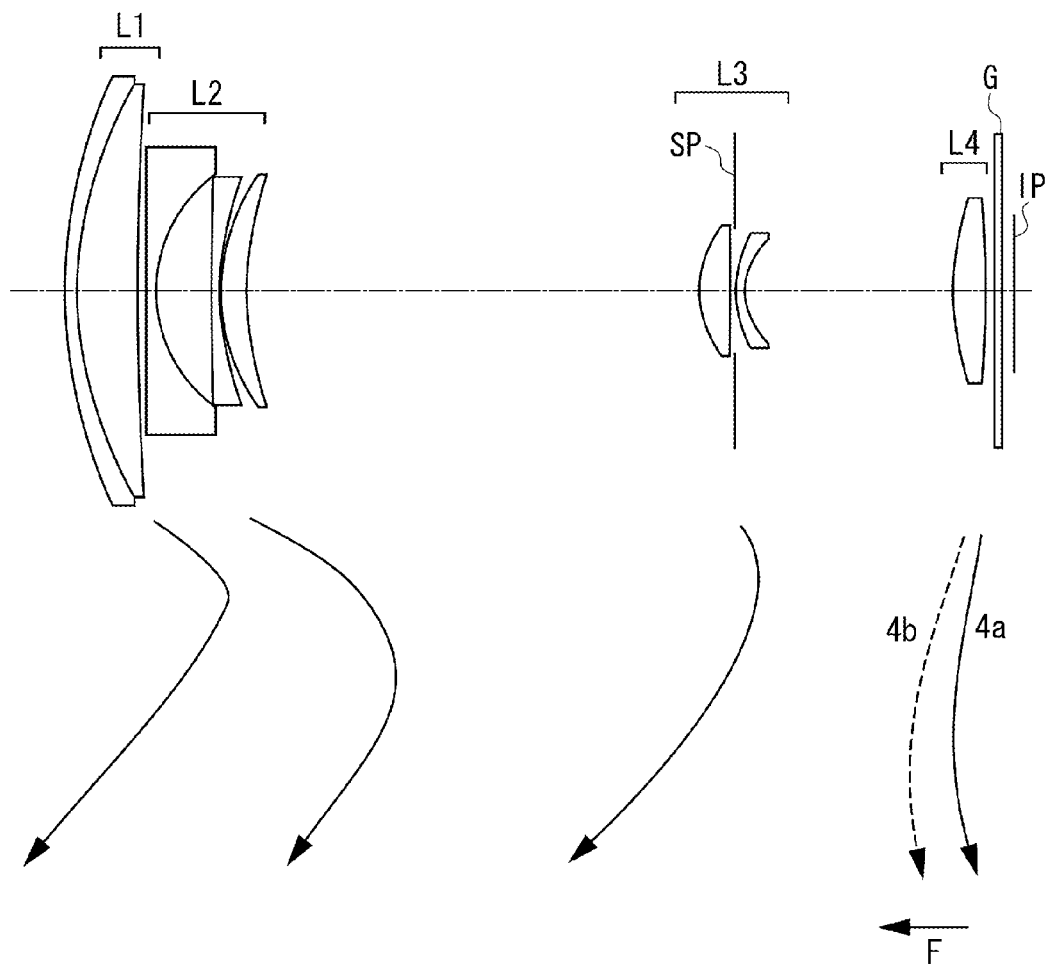
FIG. 7 is a lens cross-sectional view illustrating a zoom lens at the wide-angle end, according to a fourth embodiment.
Figure 8A:
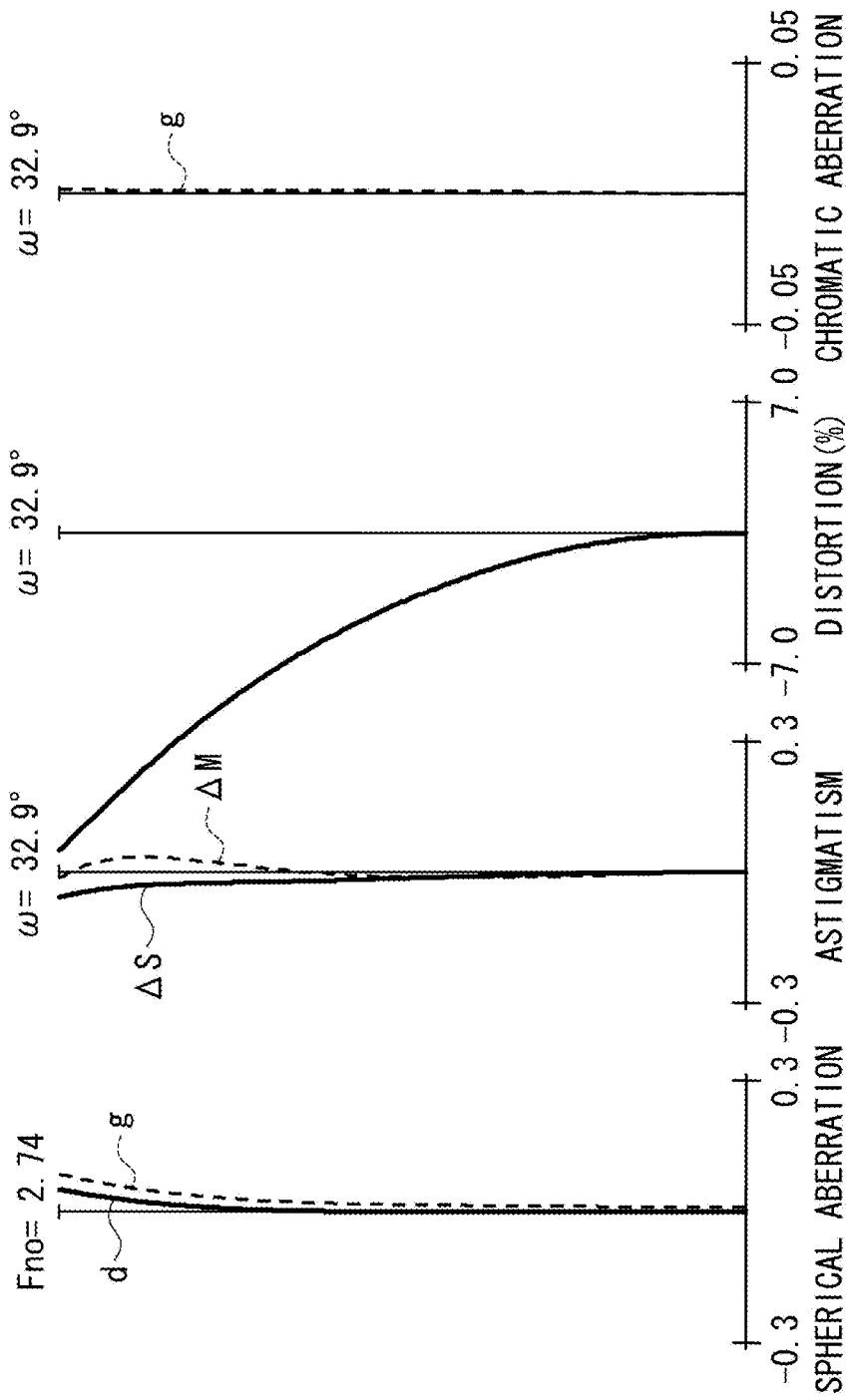
Figure 8B:
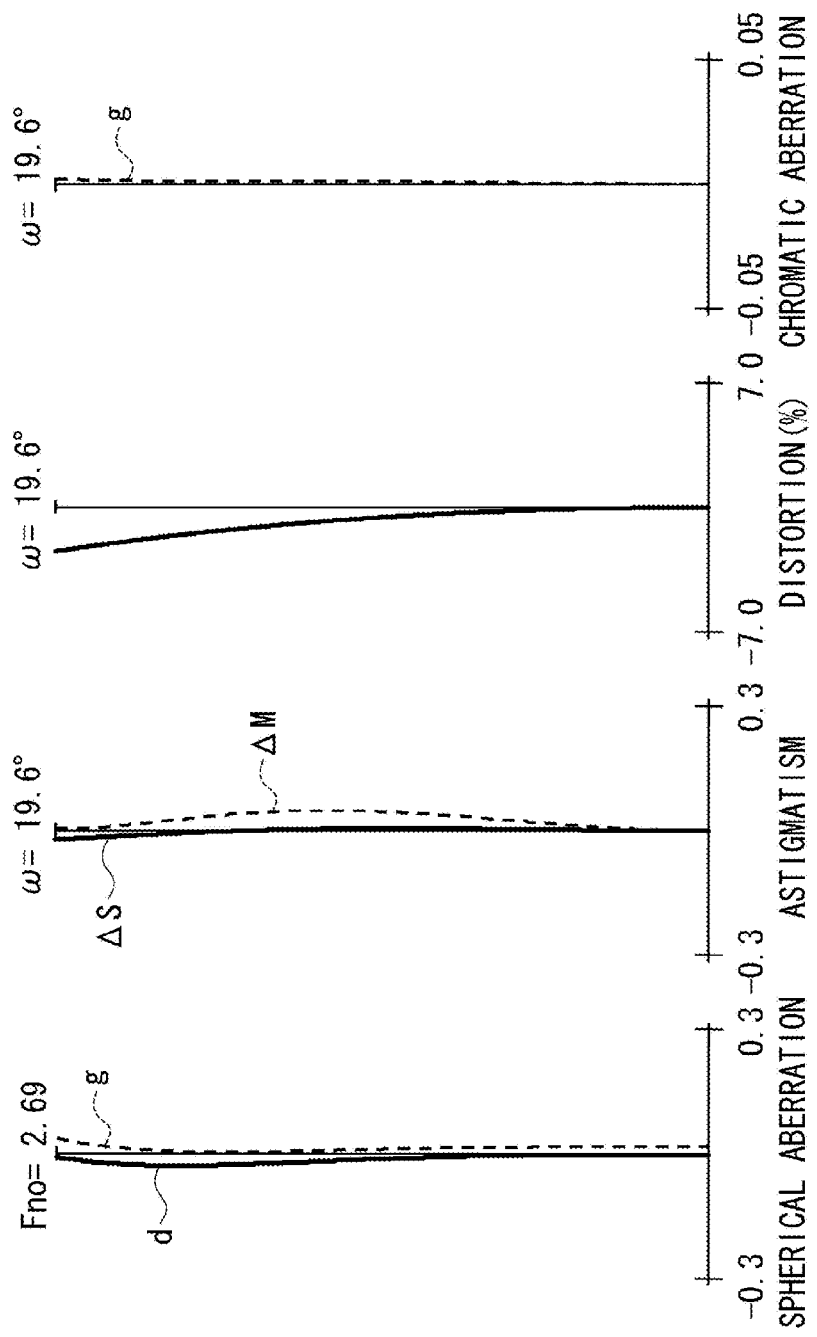
Figure 9:
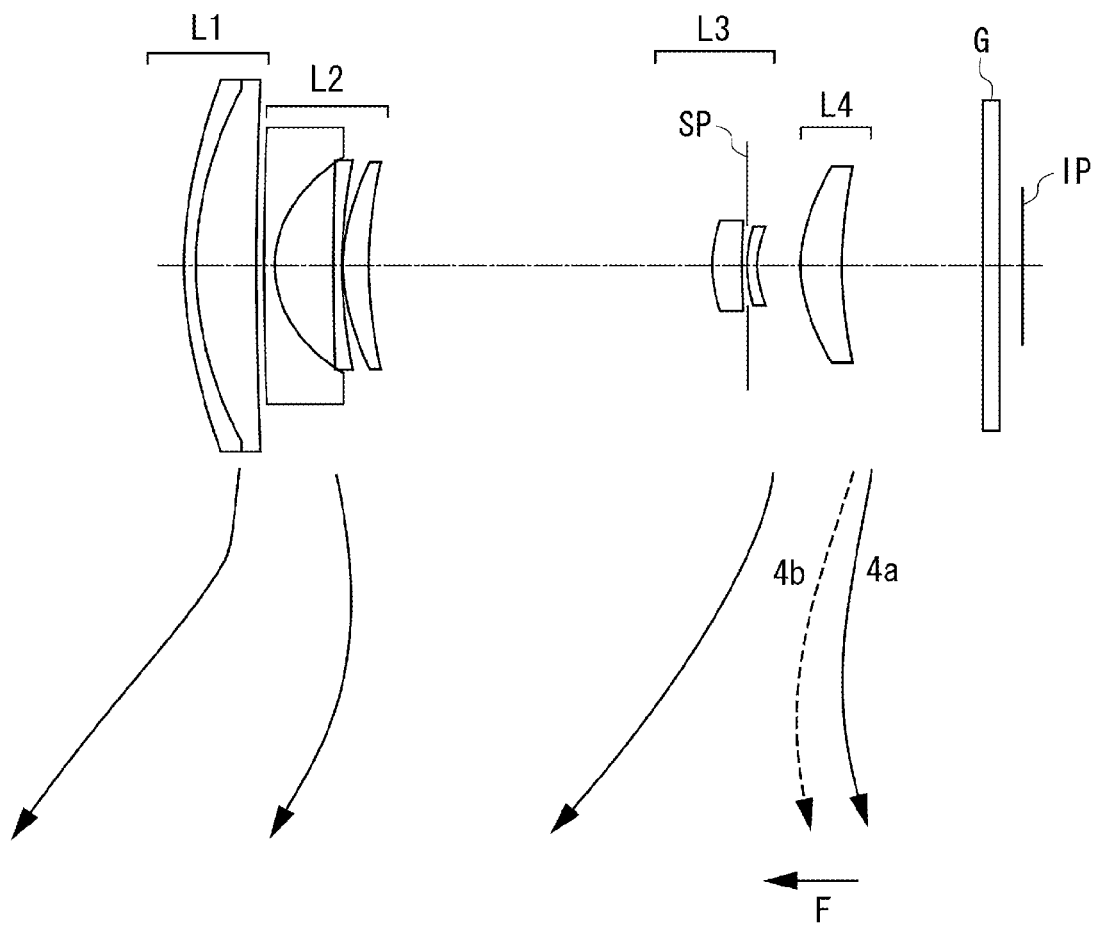
FIG. 9 is a lens cross-sectional view illustrating a zoom lens at the wide-angle end, according to a fifth embodiment.
Figure 10A:
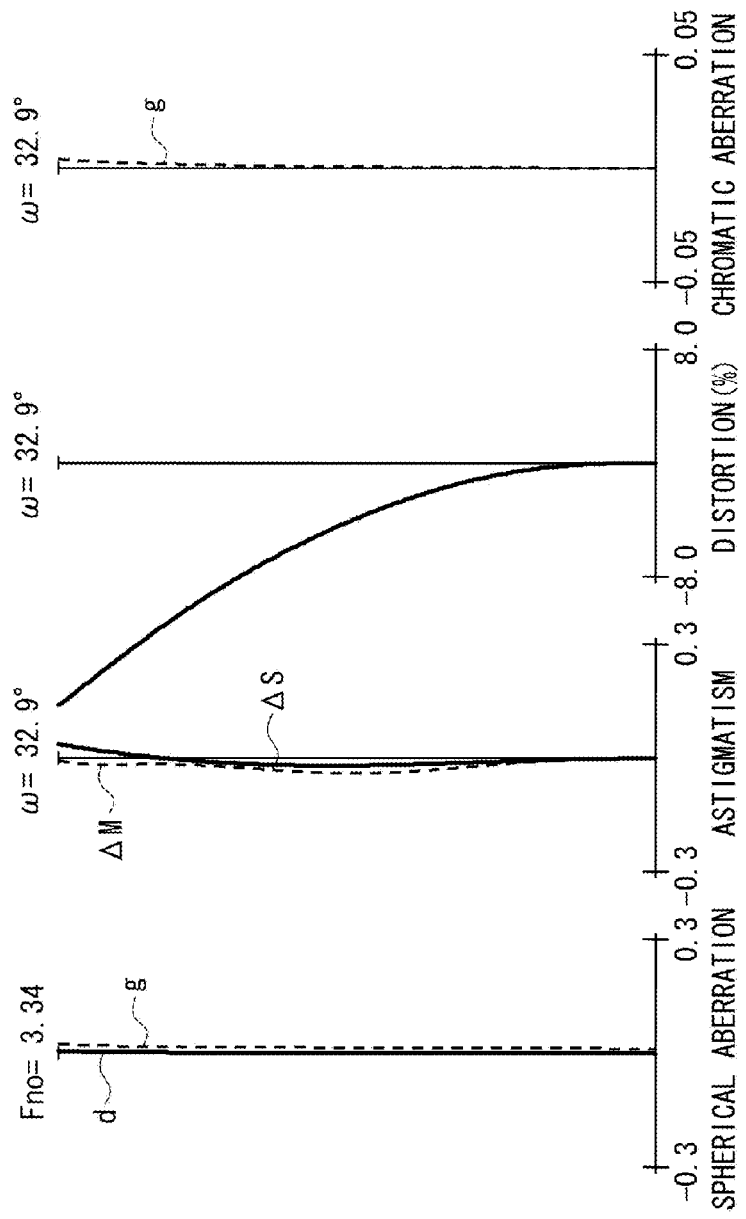
FIGS. 10A, 10B, and 10C are aberration charts of the zoom lens at the wide-angle end, the middle zoom position, and the telephoto end, respectively, according to the fifth embodiment.
Figure 10B:
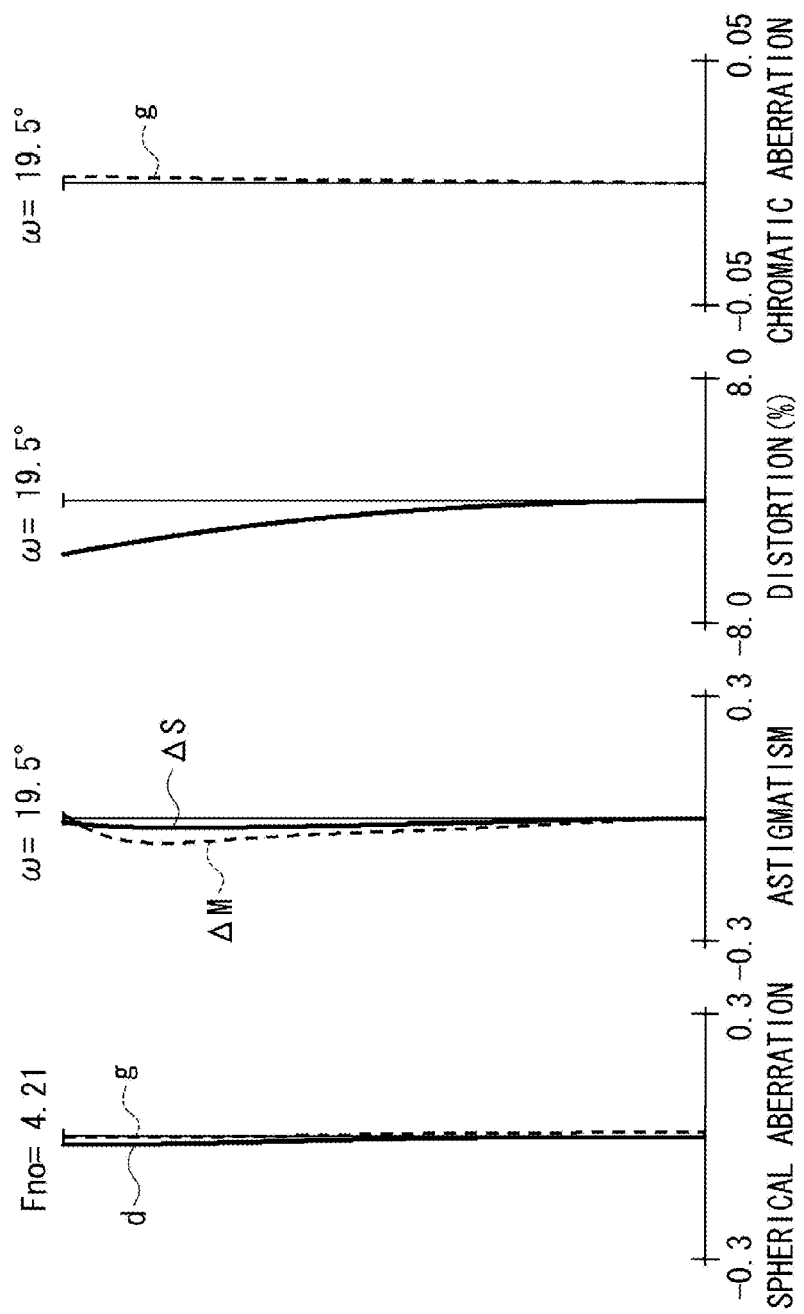
Figure 10C:
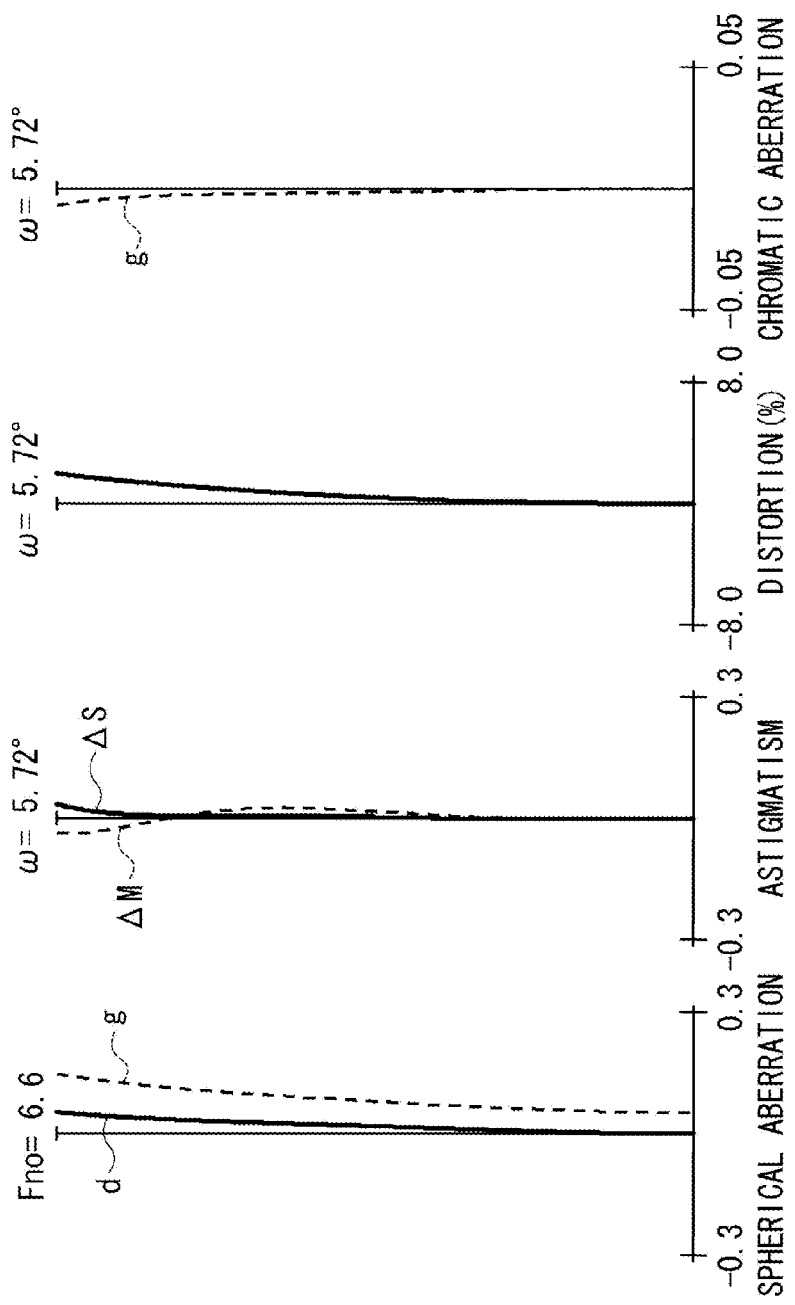

FIG. 7 is a lens cross-sectional view illustrating a zoom lens at the wide-angle end, according to a fourth embodiment of the invention. FIGS. 8A, 8B, and 8C are aberration charts of the zoom lens at the wide-angle end, the middle zoom position, and the telephoto end, respectively, according to the fourth embodiment. FIG. 9 is a lens cross-sectional view illustrating a zoom lens at the wide-angle end, according to a fifth embodiment of the invention. FIGS. 10A, 10B, and 10C are aberration charts of the zoom lens at the wide-angle end, the middle zoom position, and the telephoto end, respectively, according to the fifth embodiment.

Figure 11A:
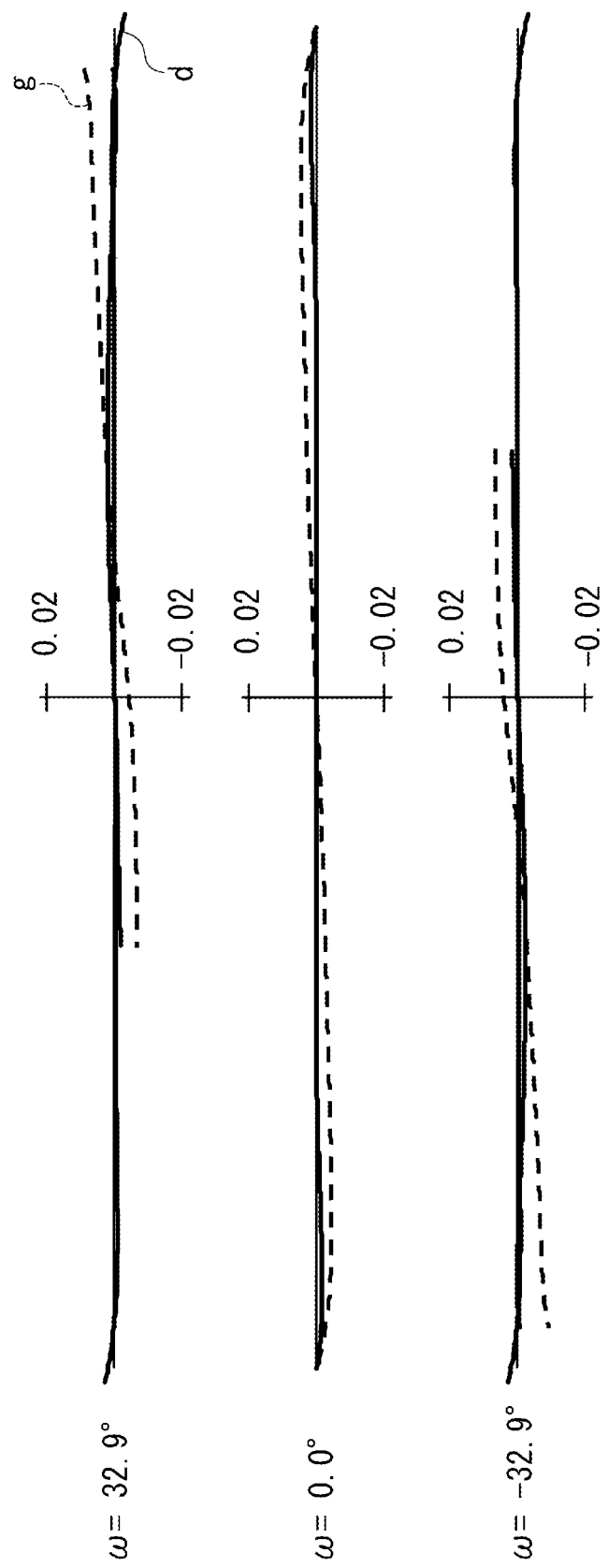
Figure 12A:
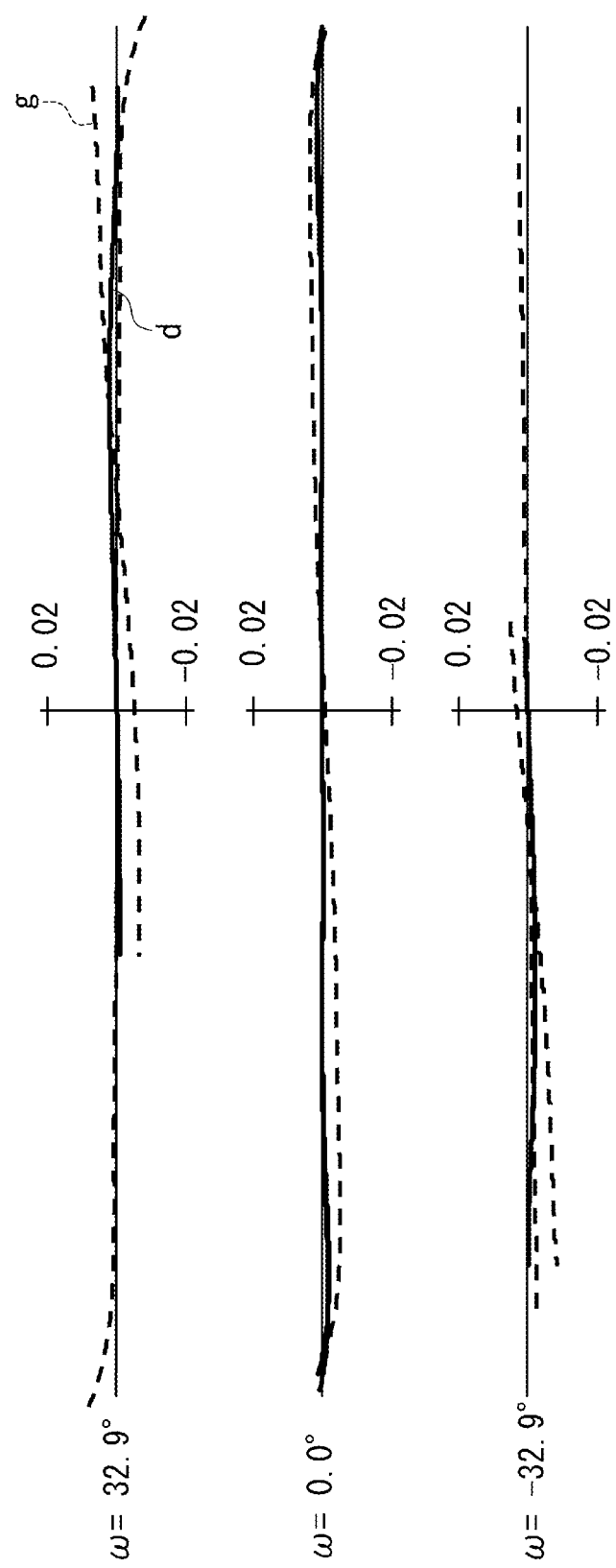
FIGS. 12A and 12B are lateral aberration charts when an image stabilizing operation is performed by 3° at the wide-angle end and when an image stabilizing operation is performed by 0.3° at the telephoto end, respectively, using the zoom lens according to the first embodiment of the invention.
Figure 12B:
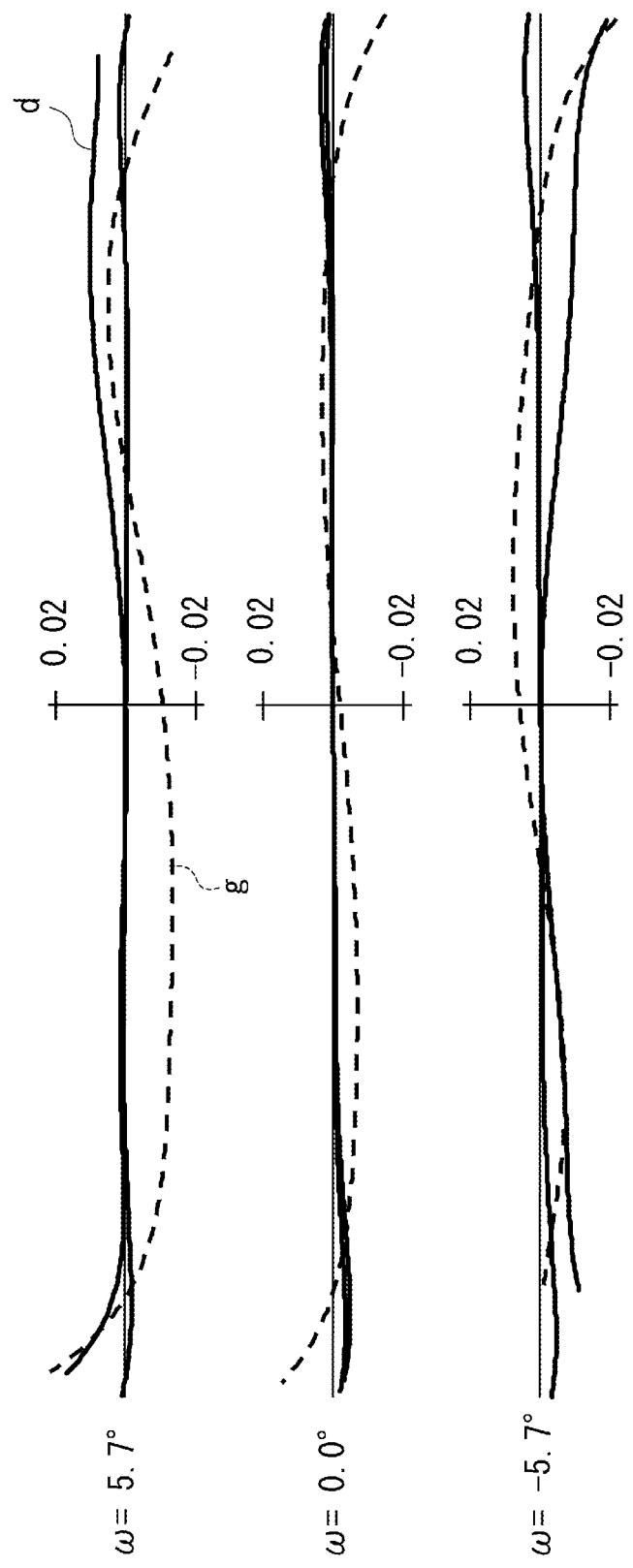
Figure 13:
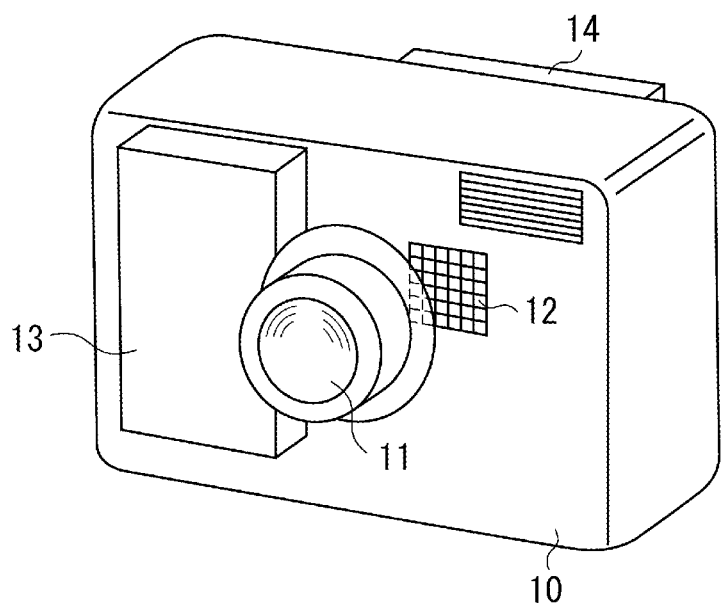
FIG. 13 is a schematic diagram illustrating main parts of an image pickup apparatus according to an exemplary embodiment of the invention.

FIGS. 11A and 11B are lateral aberration charts of the zoom lens according to the first embodiment of the invention at the wide-angle end and the telephoto end, respectively, in a standard state, in which the image stabilizing operation is not performed. FIGS. 12A and 12B are lateral aberration charts when an image stabilizing operation is performed using the third lens unit at the wide-angle end and the telephoto end, respectively, using the zoom lens according to the first embodiment of the invention. FIG. 13 is a schematic diagram illustrating main parts of an image pickup apparatus having the zoom lens according to an exemplary embodiment of the invention.

The zoom lens according to the first to fifth embodiments of the invention is a photographic lens system used in an image pickup apparatus. In the lens cross-sectional views, the left side refers to the object side (front side), and the right side refers to the image side (rear side). L1 denotes the first lens unit having positive refractive power, L2 denotes the second lens unit having negative refractive power, L3 denotes the third lens unit having positive refractive power, and L4 denotes the fourth lens unit having positive refractive power. SP denotes a stop (aperture stop) that determines an F-number for restricting a full-aperture F-number light flux.

The aperture stop SP is arranged in the third lens unit L3. As shown in FIGS. 1, 5, 7 and 9, the aperture stop SP may be arranged between a positive lens 31 and a negative lens 32 of the third lens unit L3. Alternatively, as shown in FIG. 3, the aperture stop SP may be arranged on the object side of the positive lens 31 in the third lens unit L3. G denotes an optical block corresponding to an optical filter, a phase plate, or the like. IP denotes an image plane, which corresponds to an imaging surface of a solid-state image sensor (photoelectric conversion element) such as a CCD sensor or a CMOS sensor when the zoom lens is used as a photographic optical system of a video camera or a digital camera, or IP corresponds to a film surface when it is used as a photographic optical system of a silver-halide film camera.

In the aberration charts, d and g lines denote aberration with respect to Fraunhofer spectral d-line and g-line, respectively, and ΔM and ΔS lines denote aberration with respect to a meridional image plane and a sagittal image plane, respectively. Fno denotes an F-number, and ω denotes a half angle of view (degree) of photographic angle of view. For spherical aberration, the d-line (solid line) and the g-line (dotted line) are indicated. For astigmatism, ΔM and ΔS on the d-line are indicated. For distortion, the d-line is indicated. For chromatic aberration of magnification, the aberration of the g-line against the d-line is indicated. For lateral aberration, the d-line is indicated. The abscissa denotes a pupil diameter.

In each of the embodiments described below, the wide-angle end and the telephoto end refer to arrangements of each lens unit at a minimum focal length and a maximum focal length, respectively. The arrows indicate moving locus of each lens unit during zooming from the wide-angle end to the telephoto end and movement directions when focusing is performed.

In each embodiment, during zooming from the wide-angle end to the telephoto end, the first lens unit L1 is moved with a locus that is concave towards the object side, the second lens unit L2 is moved with a locus that is convex towards the object side, and the third lens unit L3 is moved towards the object side as indicated by the arrows. In addition, the fourth lens unit L4 is moved with a locus that is convex towards the object side so that an image plane variation caused by the zooming is corrected.

In this case, during zooming from the wide-angle end to the telephoto end, each lens unit is moved such that a distance between the first and second lens units L1 and L2 increases, a distance between the second and third lens units L2 and L3 decreases, and a distance between the third and fourth lens units L3 and L4 increases. In addition, focusing is performed by employing a rear focus type in which the fourth lens unit L4 is moved along the optical axis. The solid line curve 4a and the dotted line curve 4b for the fourth lens unit L4 represent movement loci for correcting an image plane variation caused by the zooming when focusing is performed for an infinitely-distant object and a close object, respectively.

In addition, in each embodiment, focusing is performed from an infinitely-distant object to a close object at the telephoto end by moving the fourth lens unit L4 to the front side as indicated by the arrow F. In addition, at the time of imaging, the image position is changed by moving the entire third lens unit L3 to have a component perpendicular to the optical axis. That is, a shake of the captured image is corrected. However, a shake of the captured image may be corrected by moving a part of the third lens unit L3 to have a component perpendicular to the optical axis.

In each embodiment, the movement conditions of each lens unit during zooming and the lens configurations of the first to fourth lens units L1 to L4 are provided as described above.

As a result, it is possible to appropriately correct chromatic aberration of magnification and coma at the telephoto end while a high zoom ratio is maintained. In addition, it is possible to reduce the front lens effective diameter while the entire lens length at the wide-angle end is reduced. In particularly, as shown in FIG. 1, since the first lens unit L1 includes a cemented lens obtained by cementing a negative lens 11n and a positive lens 11p in order from the object side to the image side, it is possible to appropriately correct chromatic aberration of magnification at the telephoto end.

Since the second lens unit L2 includes a negative lens 21, a negative lens 22, and a positive lens 23 in order from the object side to the image side, it is possible to appropriately correct curvature of field across the entire zoom range while the negative refractive power of the second lens unit L2 increases. Since the third lens unit L3 includes a positive lens 31 and a negative lens 32 in order from the object side to the image side, it is possible to appropriately correct curvature of field or coma across the entire zoom range when the refractive power of the third lens unit L3 increases.

Since the fourth lens unit L4 includes a single positive lens, it is possible to alleviate a driving load of an actuator for focusing while curvature of field is corrected. In addition, in each embodiment, M1 and M3 denote the movement amounts of the first and third lens units L1 and L3 during zooming from the wide-angle end to the telephoto end, respectively. f1 and f3 denote the focal lengths of the first and third lens units L1 and L3, respectively.

In this case, the following conditions are satisfied:

$$1.0 < M3/M1 < 3.0 \quad (1)$$

$$2.5 < f1/f3 < 8.0 \quad (2)$$

Here, the signs of the movement amounts M1 and M3 are set to be positive when the lens unit is moved towards the object side during zooming from the wide-angle end to the telephoto end and are set to be negative when the lens unit is moved towards the image side. This is similarly applied to the movement amounts of each lens unit in the following description. Next, technical meanings of the conditions (1) and (2) will be described.

The condition (1) is to appropriately set a ratio of the movement amount between the first and third lens units L1 and L3 during zooming from the wide-angle end to the telephoto end. If the upper limit of the condition (1) is exceeded, it is necessary to increase a distance between the second and third lens units L2 and L3 at the wide-angle end in order to obtain the movement amount of the third lens unit L3. As a result, a beam diameter incident to the third lens unit L3 at the wide-angle end increases, and it is difficult to suppress generation of coma and chromatic aberration of magnification at the wide-angle end. In addition, the movement amount of the first lens unit L1 is excessively reduced so that the zoom effect of the first lens unit L1 decreases, and it is difficult to obtain a predetermined zoom ratio.

If the lower limit of the condition (1) is exceeded, the movement amount of the third lens unit L3 excessively decreases, and it is necessary to increase the refractive power of the third lens unit L3 to allow the third lens unit L3 to provide a predetermined zoom effect. Then, it is difficult to correct coma and curvature of field across the entire zoom range. In addition, the movement amount of the first lens unit L1 excessively increases, and it is difficult to obtain a high zoom ratio while the entire optical length (from the first lens surface to the image plane) is suppressed.

The condition (2) is to appropriately set a ratio of the focal length between the first and third lens units L1 and L3. If the upper limit of the condition (2) is exceeded, the refractive power of the first lens unit L1 excessively decreases, and the zoom effect of the first lens unit L1 decreases. For this reason, it is difficult to obtain a high zoom ratio while the entire optical length is suppressed. In addition, the refractive power of the third lens unit L3 excessively increases, and it is difficult to appropriately correct coma and curvature of field across the entire zoom range.

If the lower limit of the condition (2) is exceeded, the refractive power of the first lens unit L1 excessively increases, and it is difficult to suppress variations such as axial chromatic aberration, chromatic aberration of magnification, coma, and a variation of curvature of field across the entire zoom range, particularly, at the telephoto end. In addition, the refractive power of the third lens unit L3 excessively decreases, and the zoom effect of the third lens unit L3 decreases. For this reason, it is difficult to obtain a high zoom ratio while increase of the entire optical length is suppressed.

More usefully, the numerical ranges of the conditions (1) and (2) are set as follows:

$$1.00 < M3/M1 < 1.45 \quad (1a)$$

$$2.5 < f1/f3 < 4.1 \quad (2a)$$

As described above, according to each embodiment of the invention, it is possible to obtain a zoom lens having a small size in entirety with a wide viewing angle and high optical performance across the entire zoom range.

According to an exemplary embodiment of the invention, it is useful to satisfy at least one of the following conditions in order to obtain high optical performance with a high zoom ratio while the entire zoom lens is miniaturized.

$$1.0 < M3/DA < 4.0 \quad (3)$$

$$0.95 < M1/DA < 6.00 \quad (4)$$

$$2.0 < TDt/DA < 6.0 \quad (5)$$

$$-1.0 < M2/DA < 1.0 \quad (6)$$

$$2.0 < f1/|f2| < 6.0 \quad (7)$$

$$0.15 < f3/f4 < 1.60 \quad (8)$$

$$1.0 < f4/fw < 15.0 \quad (9)$$

$$0.1 < M1/ft < 3.0 \quad (10)$$

$$0.1 < |f2|/f3 < 2.0 \quad (11)$$

$$-0.5 < (M3-M1)/TDt < 0.2 \quad (12)$$

$$0.45 < (\beta 2t/\beta 2w)/(\beta 3t/\beta 3w) < 3.00 \quad (13)$$

Here, DA denotes a sum of the thicknesses of the first to fourth lens units L1 to L4 on the optical axis, and TDt denotes a distance from the lens surface of the object side of the first lens unit L1 to the image plane at the telephoto end. fw and ft denote focal lengths of the entire zoom lens at the wide-angle end and the telephoto end, respectively. M2 denotes a movement amount of the second lens unit L2 during zooming from the wide-angle end to the telephoto end. $\beta 2t$ and $\beta 2w$ denote lateral magnifications of the second lens unit L2 at the telephoto end and the wide-angle end, respectively, and $\beta 3t$ and $\beta 3w$ denote lateral magnifications of the third lens unit L3 at the telephoto end and the wide-angle end, respectively. f2 denotes a focal length of the second lens unit L2. f2 and f4 denote focal lengths of the second and fourth lens units L2 and L4, respectively.

Here, the sum DA of thicknesses of the respective lens units on the optical axis does not include an optical filter corresponding to a low-pass filter, protection glass, and the like.

The length Tdt on the optical axis from the first lens surface to the image plane at the telephoto end is obtained by setting the thickness of the optical filter such as a low-pass filter or protection glass to an air-equivalent value.

Next, technical meanings of each condition will be described. The condition (3) is to appropriately set a ratio between the movement amount of the third lens unit L3 during zooming from the wide-angle end to the telephoto end and a sum of thicknesses of the respective lens units on the optical axis.

If the upper limit of the condition (3) is exceeded, it is necessary to increase the distance between the second and third lens units L2 and L3 at the wide-angle end in order to obtain the movement amount of the third lens unit L3. As a result, a beam diameter incident to the third lens unit L3 at the wide-angle end increases, and it is difficult to suppress generation of coma and chromatic aberration of magnification at the wide-angle end. In addition, the thicknesses of the respective lens units on the optical axis excessively decrease, and it is difficult to sufficiently obtain an edge thickness or a central thickness.

If the lower limit of the condition (3) is exceeded, the refractive power of the third lens unit L3 excessively increases, and it is difficult to appropriately correct curvature of field across the entire zoom range. In addition, the thicknesses of the respective lens units on the optical axis excessively increase, and it is difficult to reduce a thickness of the entire zoom lens at the time of retraction.

The condition (4) is to appropriately set a ratio between the movement amount of the first lens unit L1 during zooming from the wide-angle end to the telephoto end and the sum of thicknesses of the respective lens units on the optical axis. If the upper limit of the condition (4) is exceeded, the movement amount of the first lens unit L1 excessively increases, and the entire optical length increases. In addition, the thicknesses of the respective lens units on the optical axis excessively decrease, and it is difficult to sufficiently obtain an edge thickness and a central thickness.

In addition, if the lower limit of the condition (4) is exceeded, the movement amount of the first lens unit L1 excessively decreases, and it is necessary to increase the refractive power of the first lens unit L1 in order to allow the first lens unit L1 to have a zoom effect when a high zoom ratio is obtained. Then, it is difficult to suppress axial chromatic aberration and coma at the telephoto end and a variation of curvature of field across the entire zoom range. In addition, the thicknesses of the respective lens units on the optical axis excessively increase, and it is difficult to reduce a thickness of the entire zoom lens at the time of retraction.

The condition (5) is to appropriately set a ratio between the entire optical length of the telephoto end and the sum of thicknesses of the respective lens units on the optical axis. If the upper limit of the condition (5) is exceeded, the entire optical length at the telephoto end excessively increases so that it is necessary to provide a multi-stage lens barrel in order to reduce a thickness of the entire zoom lens at the time of retraction. This makes a configuration of the lens barrel complicated and increases a size in a radial direction. In addition, the thicknesses of the respective lens units on the optical axis excessively decrease, and it is difficult to sufficiently obtain an edge thickness and a central thickness.

If the lower limit of the condition (5) is exceeded, the entire optical length at the telephoto end excessively decreases, and it is necessary to increase the refractive powers of each lens unit in order to obtain a high zoom ratio. Then, it is difficult to suppress axial chromatic aberration and coma at the telephoto end and a variation of curvature of field across the entire zoom range. In addition, the thicknesses of the respective lens units on the optical axis excessively increase, and it is difficult to reduce a thickness of the entire zoom lens at the time of retraction.

The condition (6) is to appropriately set a ratio between the movement amount of the second lens unit L2 during zooming from the wide-angle end to the telephoto end and the sum of thicknesses of the respective lens units on the optical axis. If the upper limit of the condition (6) is exceeded, the movement amount of the second lens unit L2 excessively increases, and it is difficult to suppress an increase of the front lens effective diameter and the entire length. In addition, the thicknesses of the respective lens units on the optical axis excessively decrease, and it is difficult to obtain an edge thickness and a central thickness.

If the lower limit of the condition (6) is exceeded, the movement amount of the second lens unit L2 excessively decreases, and it is necessary to allow the second lens unit L2 to have a greater zoom effect in order to obtain a desired zoom ratio. Then, the refractive power of the second lens unit L2 excessively increases, and it is difficult to suppress coma, chromatic aberration of magnification, and a variation of curvature of field across the entire zoom range. In addition, the thicknesses of the respective lens units on the optical axis excessively increase, and it is difficult to reduce a thickness of the entire zoom lens at the time of extraction.

The condition (7) is to appropriately set a ratio of the focal length between the first and second lens units L1 and L2. If the upper limit of the condition (7) is exceeded, the refractive power of the first lens unit L1 excessively decreases. For this reason, it is difficult to suppress an increase of the front lens effective diameter and the entire length. In addition, the refractive power of the second lens unit L2 excessively increases, and it is difficult to suppress coma, chromatic aberration of magnification, and a variation of curvature of field across the entire zoom range.

If the lower limit of the condition (7) is exceeded, the refractive power of the first lens unit L1 excessively increases, and it is difficult to suppress axial chromatic aberration or coma at the telephoto end and a variation of curvature of field across the entire zoom range. In addition, the refractive power of the second lens unit L2 excessively decreases, and it is necessary to increase the movement amount of the second lens unit L2 in order to obtain a high zoom ratio. Then, it is difficult to suppress an increase of the front lens effective diameter and the entire optical length.

The condition (8) is to appropriately set a ratio of the focal length between the third and fourth lens units L3 and L4. If the upper limit of the condition (8) is exceeded, the refractive power of the third lens unit L3 excessively decreases, and it is necessary to increase the movement amount of the third lens unit L3 in order to obtain a high zoom ratio. Then, it is difficult to suppress coma and chromatic aberration of magnification at the wide-angle end. In addition, the refractive power of the fourth lens unit L4 excessively increases, and it is difficult to suppress chromatic aberration of magnification at the wide-angle end and a variation of curvature of field across the entire zoom range.

If the lower limit of the condition (8) is exceeded, the refractive power of the third lens unit L3 excessively increases, and it is difficult to suppress axial chromatic aberration or coma at the telephoto end and a variation of curvature of field across the entire zoom range. In addition, the refractive power of the fourth lens unit L4 excessively decreases, and the movement amount of the fourth lens unit L4 increases so that it is difficult to suppress an increase of the entire optical length at the telephoto end.

The condition (9) is to appropriately set a ratio between the focal length of the fourth lens unit L4 and the focal length of the entire zoom lens at the wide-angle end. If the upper limit of the condition (9) is exceeded, the refractive power of the fourth lens unit L4 excessively decreases, and it is necessary to increase the movement amount of the fourth lens unit L4 in order to obtain a high zoom ratio. Then, it is difficult to obtain a high zoom ratio while the entire optical length is suppressed.

If the lower limit of the condition (9) is exceeded, the refractive power of the fourth lens unit L4 excessively increases, and it is difficult to suppress coma at the wide-angle end and a variation of curvature of field across the entire zoom range.

The condition (10) is to appropriately set a ratio between the movement amount of the first lens unit L1 during zooming from the wide-angle end to the telephoto end and the focal length of the entire zoom lens at the telephoto end. If the upper limit of the condition (10) is exceeded, the movement amount of the first lens unit L1 excessively increases, and it is difficult to suppress an increase of the front lens effective diameter and the entire optical length.

If the lower limit of the condition (10) is exceeded, the refractive power of the first lens unit L1 excessively increases, and it is difficult to suppress coma and chromatic aberration of magnification at the telephoto end and a variation of curvature of field across the entire zoom range.

The condition (11) is to appropriately set the focal lengths of the second and third lens units L2 and L3. If the upper limit of the condition (11) is exceeded, the refractive power of the second lens unit L2 excessively decreases, and it is necessary to increase the movement amount of the second lens unit L2 in order to obtain a high zoom ratio. Then, the front lens effective diameter and the entire optical length disadvantageously increase.

In addition, the refractive power of the third lens unit L3 excessively increases, and it is difficult to suppress axial chromatic aberration or coma at the telephoto end and a variation of curvature of field across the entire zoom range. If the lower limit of the condition (11) is exceeded, the refractive power of the second lens unit L2 excessively increases, and it is difficult to suppress coma, chromatic aberration of magnification, and a variation of curvature of field across the entire zoom range. In addition, the refractive power of the third lens unit L3 excessively decreases, and the zoom effect of the third lens unit L3 decreases so that it is difficult to obtain a high zoom ratio while the entire optical length is suppressed.

The condition (12) is to appropriately set a ratio between the movement amounts of the first and third lens units L1 and L3 during zooming from the wide-angle end to the telephoto end and the entire optical length at the telephoto end. If the upper limit of the condition (12) is exceeded, it is necessary to increase the distance between the second and third lens units L2 and L3 at the wide-angle end in order to obtain the movement amount of the third lens unit L3.

As a result, the beam diameter incident to the third lens unit L3 at the wide-angle end increases, and it is difficult to suppress coma and chromatic aberration of magnification at the wide-angle end. If the lower limit of the condition (12) is exceeded, the entire optical length at the telephoto end increases, and it is necessary to provide a multi-stage lens barrel in order to reduce a thickness of the entire zoom lens at the time of retraction. As a result, a configuration of the lens barrel becomes complicated. In addition, a size in the radial direction increases.

The condition (13) is to appropriately set a ratio of contribution of variable power between the second and third lens units L2 and L3 and obtain high optical performance across the entire zoom range with a high zoom ratio. If the upper limit of the condition (13) is exceeded, the contribution of variable power of the second lens unit L2 excessively increases in comparison with the contribution of variable power of the third lens unit L3 so that it is difficult to suppress astigmatism, coma, and a variation of curvature of field across the entire zoom range.

If the lower limit of the condition (13) is exceeded, the contribution of variable power of the second lens unit L2 excessively decreases in comparison with the contribution of variable power of the third lens unit L3 so that it is necessary to increase the movement amount of the second lens unit L2 in order to obtain a high zoom ratio. Then, it is difficult to suppress an increase of the front lens effective diameter and the entire optical length.

In each embodiment, the third lens unit L3 includes an image stabilizing operation lens unit for reducing an image shake. For example, it is possible to correct a shake of the captured image by moving the entire third lens unit L3 in a direction perpendicular to the optical axis.

FIGS. 11A and 11B are lateral aberration charts of the zoom lens according to the first embodiment at the wide-angle end and the telephoto end, respectively, in a standard state, in which the image stabilizing operation is not performed using the third lens unit L3. FIGS. 12A and 12B are lateral aberration charts of the zoom lens according to the first embodiment at the wide-angle end (image stabilizing operation by 3°) and the telephoto end (image stabilizing operation by 0.3°), respectively, when the image stabilizing operation is performed using the third lens unit L3. From these charts, it is recognized that excellent optical performance can be maintained even when the image stabilizing operation is performed.

An aperture stop or a stop unit may be solely moved during zooming from the wide-angle end to the telephoto end. More usefully, the numerical range of each condition may be set as follows:

$$1.34 < M3/DA < 1.91 \quad (3a)$$

$$0.95 < M1/DA < 1.71 \quad (4a)$$

$$4.34 < TDt/DA < 5.10 \quad (5a)$$

$$0.00 < M2/DA < 0.75 \quad (6a)$$

$$4.00 < f1/|f2| < 4.85 \quad (7a)$$

$$0.33 < f3/f4 < 0.71 \quad (8a)$$

$$3.83 < f4/fw < 6.35 \quad (9a)$$

$$0.25 < M1/ft < 0.55 \quad (10a)$$

$$0.60 < |f2|/f3 < 0.85 \quad (11a)$$

$$0.000 < (M3-M1)/TDt < 0.085 \quad (12a)$$

$$0.45 < (\beta 2t/\beta 2w)/(\beta 3t/\beta 3w) < 2.30 \quad (13a)$$

When the zoom lens according each embodiment is applied to an image pickup apparatus, distortion of a captured image out of various types of aberration may be corrected through electric image processing.

In each embodiment, one or more lens units having a refractive power may be arranged on at least one of the object side of the first lens unit L1 or the image side of the fourth lens unit L4. Through the configuration described above, it is possible to reduce the entire lens length and obtain a wide viewing angle and excellent optical performance across the entire zoom range from the wide-angle end to the telephoto end. In particular, it is possible to obtain a zoom lens having a zoom ratio of approximately ×8 to ×10, in which chromatic aberration, curvature of field, and the like across the entire zoom range from the wide-angle end to the telephoto end are appropriately corrected while the thicknesses or the movement amounts of each lens unit affected at the time of retraction are reduced.

Hereinafter, Numerical Examples 1 to 5 corresponding to the first to fifth exemplary embodiments will be described. In each numerical example, i denotes the order of surfaces from the object side, and ri denotes a radius of curvature of the i-th surface. di denotes a distance between the i-th surface and the (i+1)th surface. ndi and vdi denote a refractive index and an Abbe number, respectively, of a material of the i-th optical member with respect to the d-line. In addition, in Numerical Examples 1 to 5, the last two surfaces closest to the image side are surfaces corresponding to the optical block G. For an aspheric shape, a displacement in an optical axis direction at the position of a height H from the optical axis is indicated by X with respect to a surface vertex. A propagating direction of light is set to be positive. R denotes a paraxial radius of curvature, and k denotes a conic constant. A4, A6, and A8 denote aspheric coefficients. In this case, the following expression is satisfied:

$$X = (H^2/R)/\{1 + [1-(1+k)(H/R)^2]^{1/2}\} + A4H^4 + A6H^6 + A8H^8$$

In the numerical examples listed below, the asterisk (*) next to the surface number denotes a surface having an aspheric shape. The scientific notation of the form "1E-00Z" is equivalent to the normalized exponential notation "1×10$^{-00Z}$". BF denotes a back focus. A distance from the last lens surface on the image side to the image plane is indicated by an air-equivalent amount. Table 1 shows a relationship between each of the aforementioned conditions and various numerical values of the numerical examples.

Numerical Example 1

| Unit mm | | | | |
|---|---|---|---|---|
| Surface Data | | | | |
| Surface Number | r | d | nd | vd |
| 1 | ∞ | 0.00 | | |
| 2 | 18.275 | 0.60 | 1.92286 | 18.9 |
| 3 | 14.029 | 2.75 | 1.77250 | 49.6 |
| 4 | 94.141 | Variable | | |
| 5 | 247.891 | 0.50 | 1.85135 | 40.1 |
| 6* | 5.824 | 2.65 | | |
| 7 | −21.004 | 0.40 | 1.48749 | 70.2 |
| 8 | 17.123 | 0.10 | | |
| 9 | 9.825 | 1.08 | 1.95906 | 17.5 |
| 10 | 20.517 | Variable | | |
| 11 | ∞ | −0.40 | | |
| 12* | 4.786 | 1.55 | 1.76802 | 49.2 |
| 13* | −40.494 | 0.20 | | |
| 14(Stop) | ∞ | 0.00 | | |
| 15 | 6.204 | 0.45 | 1.92286 | 18.9 |
| 16 | 3.471 | 1.00 | | |
| 17 | ∞ | 0.00 | | |
| 18 | ∞ | 1.00 | | |
| 19 | ∞ | Variable | | |
| 20* | 11.620 | 1.71 | 1.58313 | 59.4 |
| 21 | −3000.000 | Variable | | |
| 22 | ∞ | 0.80 | 1.51633 | 64.1 |
| Image Plane | ∞ | | | |

Unit nm

Aspheric Data

6th surface

K = 3.62105E−002 A4 = −3.21235E−005 A6 = 4.34339E−006
A8 = −1.89145E−007
12th Surface K = −6.68590E−001 A4 = −1.96155E−004 A6 = −3.71688E−005
A8 = −2.24966E−006
13th Surface K = 0.00000E+000 A4 = 1.87374E−004 A6 = −6.47688E−005
20th Surface

K = −9.23793E−001 A4 = 2.11181E−005 A6 = 2.71907E−006
A8 = −5.37025E−008

Various Data
Zoom Ratio 7.54

| | Wide Angle | Middle | Telephoto |
|---|---|---|---|
| Focal Length | 5.15 | 10.46 | 38.82 |
| F-number | 3.03 | 3.49 | 6.08 |
| Half Angle of View | 32.91 | 19.57 | 5.70 |
| Image Height | 3.33 | 3.72 | 3.88 |
| Total Lens Length | 37.56 | 37.71 | 52.13 |
| BF | 4.60 | 7.10 | 5.04 |
| d4 | 0.42 | 5.41 | 12.22 |
| d10 | 13.98 | 6.46 | 0.68 |
| d19 | 4.69 | 4.88 | 20.33 |
| d21 | 3.02 | 5.52 | 3.46 |

Zoom Lens Unit Data

| Unit | Starting Surface | Focal Length |
|---|---|---|
| 1 | 1 | 30.88 |
| 2 | 5 | −6.97 |
| 3 | 11 | 10.11 |
| 4 | 20 | 19.85 |

Numerical Example 2

Unit mm

Surface Data

| Surface Number | r | d | nd | vd |
|---|---|---|---|---|
| 1 | ∞ | 0.00 | | |
| 2 | 20.269 | 0.45 | 1.92286 | 18.9 |
| 3 | 15.575 | 2.00 | 1.77250 | 49.6 |
| 4 | 109.116 | Variable | | |
| 5 | 221.120 | 0.40 | 1.88300 | 40.8 |
| 6 | 6.105 | 2.75 | | |
| 7 | −12.882 | 0.40 | 1.88300 | 40.8 |
| 8 | −108.916 | 0.10 | | |
| 9 | 17.878 | 1.20 | 1.95906 | 17.5 |
| 10 | −138.781 | Variable | | |
| 11(Stop) | ∞ | Variable | | |
| 12* | 4.542 | 1.75 | 1.58313 | 59.4 |
| 13* | −38.384 | 0.20 | | |
| 14 | 4.916 | 0.60 | 1.95906 | 17.5 |
| 15 | 3.317 | Variable | | |
| 16 | ∞ | Variable | | |
| 17 | 17.996 | 1.05 | 1.51633 | 64.1 |
| 18 | −266.369 | Variable | | |
| 19 | ∞ | 0.80 | 1.51633 | 64.1 |
| Image Plane | ∞ | | | |

Unit mm

Aspheric Data

12th Surface

K = −1.40887E+000 A4 = 9.87130E−004 A6 = −1.25523E−006
A8 = 1.88112E−008
13th Surface

K = −1.29108E+002 A4 = 2.22366E−005

Various Data
Zoom Ratio 7.56

| | Wide Angle | Middle | Telephoto |
|---|---|---|---|
| Focal Length | 5.16 | 12.03 | 39.00 |
| F-Number | 3.28 | 4.25 | 6.08 |
| Half Angle of View | 32.87 | 17.85 | 5.67 |
| Image Height | 3.33 | 3.88 | 3.88 |
| Total Lens Length | 40.54 | 37.88 | 54.65 |
| BF | 6.66 | 12.55 | 12.16 |
| d4 | 0.40 | 4.38 | 14.59 |
| d10 | 16.84 | 5.98 | 0.83 |
| d11 | −0.40 | −0.40 | −0.40 |
| d15 | 1.40 | 1.40 | 1.40 |
| d16 | 4.47 | 2.81 | 14.90 |
| d18 | 4.67 | 10.56 | 10.17 |

Zoom Lens Unit Data

| Unit | Starting Surface | Focal Length |
|---|---|---|
| 1 | 1 | 34.17 |
| 2 | 5 | −7.41 |
| 4 | 12 | 11.08 |
| 6 | 17 | 32.69 |

Numerical Example 3

Unit mm

Surface Data

| Surface Number | r | d | nd | vd |
|---|---|---|---|---|
| 1 | ∞ | 0.00 | | |
| 2 | 19.390 | 0.60 | 1.92286 | 18.9 |
| 3 | 14.802 | 2.75 | 1.77250 | 49.6 |
| 4 | 160.996 | Variable | | |
| 5 | 546.228 | 0.50 | 1.85135 | 40.1 |
| 6* | 6.131 | 2.65 | | |
| 7 | −19.955 | 0.40 | 1.48749 | 70.2 |
| 8 | 14.333 | 0.10 | | |
| 9 | 9.714 | 1.08 | 1.95906 | 17.5 |
| 10 | 20.563 | Variable | | |
| 11 | ∞ | −0.40 | | |
| 12* | 4.673 | 1.60 | 1.76802 | 49.2 |
| 13* | −59.081 | 0.20 | | |
| 14(Stop) | ∞ | 0.00 | | |
| 15 | 6.356 | 0.45 | 1.92286 | 18.9 |
| 16 | 3.482 | 1.00 | | |
| 17 | ∞ | 0.00 | | |
| 18 | ∞ | 1.00 | | |
| 19 | ∞ | Variable | | |
| 20* | 11.655 | 1.72 | 1.58313 | 59.4 |
| 21 | −1538.632 | Variable | | |
| 22 | ∞ | 0.80 | 1.51633 | 64.1 |
| Image Plane | ∞ | | | |

-continued

Unit mm

Aspheric Data

6th Surface

K = 2.75945E-002 A4 = 5.52482E-005 A6 = -8.02334E-008
A8 = 5.80968E-008

12th Surface

K = -6.25371E-001 A4 = -9.23742E-005 A6 = -3.73035E-006
A8 = -7.07523E-007

13th Surface

K = 0.00000E+000 A4 = 3.37050E-004 A6 = -1.58765E-005

20th Surface

K = -6.70977E-001 A4 = 1.54497E-005 A6 = 6.72109E-007
A8 = 1.55464E-008

Various Data
Zoom Ratio 9.42

|  | Wide Angle | Middle | Telephoto |
|---|---|---|---|
| Focal Length | 5.15 | 10.51 | 48.50 |
| F-Number | 2.51 | 2.94 | 6.08 |
| Half Angle of View | 32.91 | 19.50 | 4.57 |
| Image Height | 3.33 | 3.72 | 3.88 |
| Total Lens Length | 38.62 | 38.97 | 59.17 |
| BF | 4.91 | 7.36 | 4.93 |
| d4 | 0.38 | 5.19 | 11.96 |
| d10 | 14.65 | 7.13 | 0.69 |
| d19 | 4.76 | 5.38 | 27.67 |
| d21 | 3.33 | 5.78 | 3.35 |

Zoom Lens Unit Data

| Unit | Starting Surface | Focal Length |
|---|---|---|
| 1 | 1 | 30.17 |
| 2 | 5 | -6.85 |
| 3 | 11 | 10.43 |
| 4 | 20 | 19.84 |

Numerical Example 4

Unit mm

Surface Data

| Surface Number | r | d | nd | vd |
|---|---|---|---|---|
| 1 | ∞ | 0.00 | | |
| 2 | 26.465 | 0.60 | 1.92286 | 18.9 |
| 3 | 20.266 | 2.98 | 1.77250 | 49.6 |
| 4 | 132.234 | Variable | | |
| 5 | -4024.505 | 0.50 | 1.85135 | 40.1 |
| 6* | 7.215 | 2.80 | | |
| 7 | 198.088 | 0.40 | 1.48749 | 70.2 |
| 8 | 14.871 | 0.10 | | |
| 9 | 9.715 | 1.31 | 1.95906 | 17.5 |
| 10 | 16.121 | Variable | | |
| 11 | ∞ | -0.40 | | |
| 12* | 4.823 | 1.70 | 1.76802 | 49.2 |
| 13* | 3986.156 | 0.20 | | |
| 14(Stop) | ∞ | 0.00 | | |
| 15 | 5.787 | 0.45 | 1.92286 | 18.9 |
| 16 | 3.425 | 1.00 | | |
| 17 | ∞ | 0.00 | | |
| 18 | ∞ | 1.00 | | |
| 19 | ∞ | Variable | | |
| 20* | 14.022 | 1.64 | 1.58313 | 59.4 |

-continued

Unit mm

| | | | | |
|---|---|---|---|---|
| 21 | -63.562 | Variable | | |
| 22 | ∞ | 0.50 | 1.51633 | 64.1 |
| Image Plane | ∞ | | | |

Aspheric Data

6th Surface

K = -1.78247E-001 A4 = 6.06183E-005 A6 = 1.34856E-007
A8 = 5.66110E-008

12th Surface

K = -8.45480E-001 A4 = 2.71785E-004 A6 = 2.97341E-006
A8 = -2.32851E-007

13th Surface

K = 0.00000E+000 A4 = 1.82999E-004 A6 = -5.92472E-006

20th Surface

K = -2.65149E+001 A4 = 1.00348E-003 A6 = -2.95398E-005
A8 = 5.05159E-007

Various Data
Zoom Ratio 9.45

|  | Wide Angle | Middle | Telephoto |
|---|---|---|---|
| Focal Length | 5.15 | 10.46 | 48.68 |
| F-Number | 2.74 | 2.69 | 6.08 |
| Half Angle of View | 32.91 | 19.58 | 4.55 |
| Image Height | 3.33 | 3.72 | 3.88 |
| Total Lens Length | 48.44 | 42.78 | 60.79 |
| BF | 1.73 | 7.29 | 1.54 |
| d4 | 0.50 | 8.52 | 17.98 |
| d10 | 23.23 | 8.32 | 0.74 |
| d19 | 8.54 | 4.20 | 26.08 |
| d21 | 0.50 | 6.06 | 0.31 |

Zoom Lens Unit Data

| Unit | Starting Surface | Focal Length |
|---|---|---|
| 1 | 1 | 45.4 |
| 2 | 5 | -9.39 |
| 3 | 11 | 11.41 |
| 4 | 20 | 19.86 |

Numerical Example 5

Unit mm

Surface Data

| Surface Number | r | d | nd | vd |
|---|---|---|---|---|
| 1 | ∞ | 0.00 | | |
| 2 | 22.744 | 0.60 | 1.92286 | 18.9 |
| 3 | 17.837 | 2.94 | 1.77250 | 49.6 |
| 4 | 174.904 | Variable | | |
| 5 | 222.422 | 0.50 | 1.85135 | 40.1 |
| 6* | 5.302 | 2.80 | | |
| 7 | 96.286 | 0.40 | 1.48749 | 70.2 |
| 8 | 21.625 | 0.10 | | |
| 9 | 9.622 | 1.19 | 1.95906 | 17.5 |
| 10 | 18.121 | Variable | | |
| 11 | ∞ | -0.40 | | |
| 12* | 5.358 | 1.53 | 1.76802 | 49.2 |
| 13* | -1173.342 | 0.20 | | |
| 14(Stop) | ∞ | 0.00 | | |
| 15 | 6.827 | 0.45 | 1.92286 | 18.9 |
| 16 | 3.876 | 1.00 | | |

-continued

Unit mm

| 17 | ∞ | 0.00 | | |
| 18 | ∞ | 1.00 | | |
| 19 | ∞ | Variable | | |
| 20* | 7.777 | 1.99 | 1.58313 | 59.4 |
| 21 | 21.526 | Variable | | |
| 22 | ∞ | 0.80 | 1.51633 | 64.1 |
| Image Plane | ∞ | | | |

Aspheric Data

6th Surface

K = −3.58713E−001 A4 = 9.41505E−005 A6 = 5.22965E−006
A8 = 5.92670E−008

12th Surface

K = −9.37765E−001 A4 = 1.23083E−004 A6 = −2.51504E−005
A8 = −1.80171E−006

13th Surface

K = 0.00000E+000 A4 = −1.80904E−004 A6 = −4.44899E−005

20th Surface

K = −2.31052E+000 A4 = 4.76104E−004 A6 = −2.96333E−006
A8 = 5.57163E−008

Various Data
Zoom Ratio 7.52

| | Wide Angle | Middle | Telephoto |
|---|---|---|---|
| Focal Length | 5.15 | 10.49 | 38.72 |
| F-Number | 3.34 | 4.21 | 6.60 |
| Half Angle of View | 32.91 | 19.52 | 5.72 |
| Image Height | 3.33 | 3.72 | 3.88 |
| Total Lens Length | 40.47 | 44.82 | 60.98 |
| BF | 8.40 | 8.79 | 7.30 |
| d4 | 0.34 | 6.36 | 15.73 |
| d10 | 17.00 | 9.65 | 1.52 |
| d19 | 0.15 | 5.44 | 21.85 |
| d21 | 6.82 | 7.21 | 5.72 |

Zoom Lens Unit Data

| Unit | Starting Surface | Focal Length |
|---|---|---|
| 1 | 1 | 35.55 |
| 2 | 5 | −8.79 |
| 3 | 11 | 14.05 |
| 4 | 20 | 19.82 |

TABLE 1

| | | Examples | | | | |
|---|---|---|---|---|---|---|
| | Condition | 1 | 2 | 3 | 4 | 5 |
| (1) | M3/M1 | 1.104 | 1.129 | 1.116 | 1.406 | 1.004 |
| (2) | f1/f3 | 3.055 | 3.084 | 2.892 | 3.980 | 2.530 |
| (3) | M3/DA | 1.341 | 1.462 | 1.903 | 1.369 | 1.621 |
| (4) | M1/DA | 1.215 | 1.295 | 1.705 | 0.974 | 1.614 |
| (5) | TDt/DA | 4.347 | 5.014 | 4.911 | 4.796 | 4.800 |
| (6) | M2/DA | 0.232 | 0.007 | 0.744 | 0.405 | 0.402 |
| (7) | f1/|f2| | 4.432 | 4.612 | 4.403 | 4.834 | 4.045 |
| (8) | f3/f4 | 0.509 | 0.339 | 0.526 | 0.575 | 0.709 |
| (9) | f4/fw | 3.855 | 6.339 | 3.853 | 3.855 | 3.849 |
| (10) | M1/ft | 0.375 | 0.362 | 0.424 | 0.254 | 0.530 |
| (11) | |f2|/f3 | 0.689 | 0.669 | 0.657 | 0.823 | 0.626 |
| (12) | (M3 − M1)/TDt | 0.029 | 0.033 | 0.040 | 0.082 | 0.001 |
| (13) | (β2t/β2w)/(β3t/β3w) | 2.201 | 0.577 | 0.577 | 0.495 | 1.089 |

Next, a digital still camera (image pickup apparatus) in which the zoom lens according to the first to fifth embodiments is used as a photographic optical system will be described with reference to FIG. 13.

In FIG. 13, reference numeral 10 denotes a main body of the image pickup apparatus. Reference numeral 11 denotes a photographic optical system configured with the zoom lens according to an exemplary embodiment of the invention. Reference numeral 12 denotes an image sensor (photoelectric conversion element) such as a CCD sensor or a CMOS sensor that receives an object image formed by the photographic optical system 11. Reference numeral 13 denotes a recording unit that records the object image captured by the image sensor 12. Reference numeral 14 denotes a viewfinder for observing an object image displayed on a display device (not shown). The display device includes a liquid crystal panel and the like, where the object image formed on the image sensor 12 is displayed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-126123 filed Jun. 6, 2011, which is hereby incorporated by reference herein in its entirety.

What is claimed is:

1. A zoom lens comprising, in order from an object side to an image side and arranged along an optical axis thereof:
a first lens unit having positive refractive power;
a second lens unit having negative refractive power;
a third lens unit having positive refractive power; and
a fourth lens unit having positive refractive power,
wherein the first lens unit includes a cemented lens obtained by cementing negative and positive lenses in order from the object side to the image side, the second lens unit includes negative, negative, and positive lenses in order from the object side to the image side, the third lens unit includes positive and negative lenses in order from the object side to the image side, and the fourth lens unit includes a positive lens,
wherein, during zooming from a wide-angle end to the telephoto end, the first to fourth lens units move such that a distance between the first and second lens units increases, a distance between the second and third lens units decreases, and a distance between the third and fourth lens units increases, and
wherein the following conditions are satisfied:

$1.0 < M3/M1 < 3.0$, and $2.5 < f1/f3 < 8.0$, where M1 and M3 denote movement amounts of the first and third lens units, respectively, during zooming from the wide-angle end to a telephoto end, and f1 and f3 denote focal lengths of the first and third lens units, respectively.

2. The zoom lens according to claim 1, wherein the following conditions are satisfied:

$1.0 < M3/DA < 4.0$, $0.95 < M1/DA < 6.00$, and $2.0 < TDt/DA < 6.0$, where DA denotes a sum of thicknesses of the first to fourth lens units on the optical axis, and TDt denotes a distance to an image plane from an object-side lens surface of the first lens unit at the telephoto end.

3. The zoom lens according to claim 1, wherein the following conditions are satisfied:

$0.1 < M1/ft < 3.0$, $-0.5 < (M3-M1)/TDt < 0.2$, and $-1.0 < M2/DA < 1.0$, where ft denotes a focal length of the entire zoom lens at the telephoto end, M2 denotes a movement amount of the second lens unit during zooming from the wide-angle end to the telephoto end, DA denotes a sum of thicknesses of the first to fourth lens units on the optical axis, and TDt denotes a distance to an image plane from an object-side lens surface of the first lens unit at the telephoto end.

4. The zoom lens according to claim 1, wherein the following conditions are satisfied:

$2.0 < f1/|f2| < 6.0$, $0.1 < |f2|/f3 < 2.0$, and $0.45 < (\beta 2t/\beta 2w)/(\beta 3t/\beta 3w) < 3.00$, where $\beta 2t$ and $\beta 2w$ denote lateral magnifications of the second lens unit at the telephoto end and the wide-angle end, respectively, $\beta 3t$ and $\beta 3w$ denote lateral magnifications of the third lens unit at the telephoto end and the wide-angle end, respectively, and f2 denotes a focal length of the second lens unit.

5. The zoom lens according to claim 1, wherein the following conditions are satisfied:

$0.15 < f3/f4 < 1.60$, and $1.0 < f4/fw < 15.0$, where f4 denotes a focal length of the fourth lens unit, and fw denotes a focal length of the entire zoom lens at the wide-angle end.

6. An image pickup apparatus comprising:
the zoom lens according to claim 1, and
an image sensor disposed at an image plane and configured to receive an image formed by the zoom lens.

* * * * *